US012681665B2

(12) United States Patent
    Huo

(10) Patent No.: US 12,681,665 B2
(45) Date of Patent: Jul. 14, 2026

(54) OPERATION METHOD OF MEMORY CONTROLLER, MEMORY CONTROLLER AND MEMORY SYSTEM

(71) Applicant: Yangtze Memory Technologies Co., Ltd., Wuhan (CN)

(72) Inventor: Zhongchen Huo, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 52 days.

(21) Appl. No.: 18/399,521

(22) Filed: Dec. 28, 2023

(65) Prior Publication Data

US 2025/0068356 A1     Feb. 27, 2025

Related U.S. Application Data

(63) Continuation of application No. PCT/CN2023/114773, filed on Aug. 24, 2023.

(51) Int. Cl.
    G06F 3/06          (2006.01)
(52) U.S. Cl.
    CPC .......... G06F 3/0658 (2013.01); G06F 3/0619 (2013.01); G06F 3/0679 (2013.01)
(58) Field of Classification Search
    CPC ... G11C 29/028; G11C 29/022; G11C 29/023; G11C 2207/2254; G11C 11/4076;
    (Continued)

(56) References Cited

U.S. PATENT DOCUMENTS

| | | | | | |
|---|---|---|---|---|---|
| 5,781,699 A | * | 7/1998 | Dittmar | ................... | G06F 3/061 |
| | | | | | 706/902 |
| 6,499,022 B1 | | 12/2002 | Dittmar et al. | | |

(Continued)

FOREIGN PATENT DOCUMENTS

| | | |
|---|---|---|
| GB | 2390706 | 1/2004 |
| JP | H 08110902 | 4/1996 |
| JP | 2004153437 | 5/2004 |

OTHER PUBLICATIONS

Slezica et al., How can I make a random choice according to probabilities stored in a list (weighted random distribution)?, Sep. 12, 2022, StackOverflow, as preserved by the Internet Archive on Sep. 12, 2022, pp. 1-4 (Year: 2022).*

(Continued)

*Primary Examiner* — Curtis James Kortman
(74) *Attorney, Agent, or Firm* — Fish & Richardson P.C.

(57)          ABSTRACT

The present disclosure provides methods of operating a memory controller, memory controllers and memory systems, which relate to the field of memory technologies. An example method includes: in response to receiving a training instruction, at least one processor generates a plurality of control parameter sets randomly, the control parameter sets being used to adjust a size of an eye diagram for signal transmission between a memory controller and a memory. Fitness of the plurality of control parameter sets is determined. The plurality of control parameter sets are updated iteratively using a genetic algorithm until an iteration stop condition is satisfied. After the iteration is stopped, a control parameter set with the greatest fitness among the plurality of control parameter sets obtained in the latest iterative update is determined as a target control parameter set.

20 Claims, 15 Drawing Sheets

(58) Field of Classification Search
CPC .......... G11C 2029/0409; G11C 7/1093; G06F
3/0658; G06F 3/0619; G06F 3/0679
See application file for complete search history.

(56) References Cited

U.S. PATENT DOCUMENTS

| | | | | |
|---|---|---|---|---|
| 6,637,008 | B1 | 10/2003 | Higuchi et al. | |
| 2012/0021768 | A1* | 1/2012 | Rudland | G06N 3/126 |
| | | | | 455/456.1 |
| 2015/0066819 | A1* | 3/2015 | Mozak | G11C 29/028 |
| | | | | 706/12 |
| 2017/0323222 | A1* | 11/2017 | Rao | G11C 29/36 |
| 2019/0317683 | A1* | 10/2019 | Mayer | G11C 29/023 |
| 2022/0238149 | A1* | 7/2022 | Hsieh | G11C 29/028 |
| 2023/0118731 | A1* | 4/2023 | Balasubrahmanyam | |
| | | | | H03K 3/017 |
| | | | | 365/185.17 |
| 2025/0013545 | A1* | 1/2025 | Xue | G06F 11/2268 |

OTHER PUBLICATIONS

Professor Vemuri, "Genetic Algorithms", Apr. 13, 2019, UC Davis, as preserved by the Internet Archive on Apr. 13, 2019, pp. 1-9 https://web.archive.org/web/20190413021622/http://web.cs.ucdavis.edu/~vemuri/Genetic_Algorithms.htm (Year: 2019).*
Mobin, Sayid; "Statistical-Based RE DCD Jitter Analysis in High-Speed NAND Flash Memory", Aug. 13, 2020, Signal Integrity Journal, as preserved by the Internet Archive on Aug. 13, 2020, pgs. (Year: 2020).*
International Search Report and Written Opinion in International Appln. No. PCT/CN2023/114773, mailed on Apr. 12, 2024, 6 pages.

* cited by examiner

11

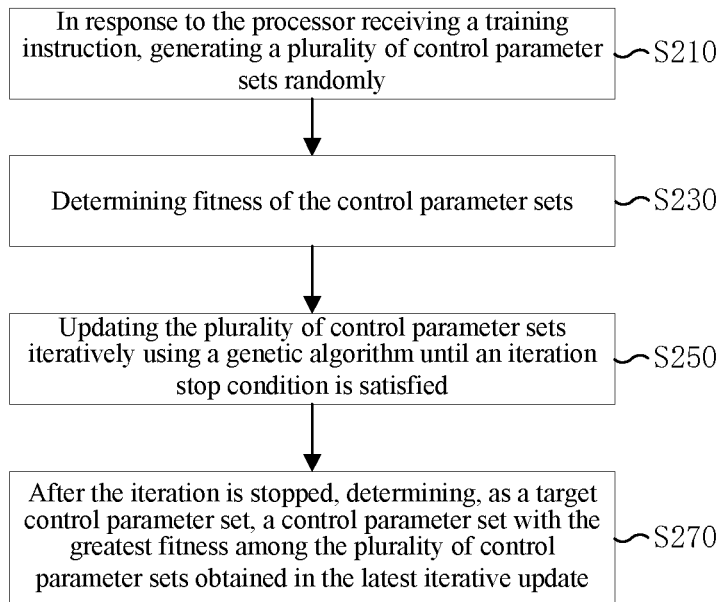

In response to the processor receiving a training instruction, generating a plurality of control parameter sets randomly — S210

Determining fitness of the control parameter sets — S230

Updating the plurality of control parameter sets iteratively using a genetic algorithm until an iteration stop condition is satisfied — S250

After the iteration is stopped, determining, as a target control parameter set, a control parameter set with the greatest fitness among the plurality of control parameter sets obtained in the latest iterative update — S270

Fig. 6

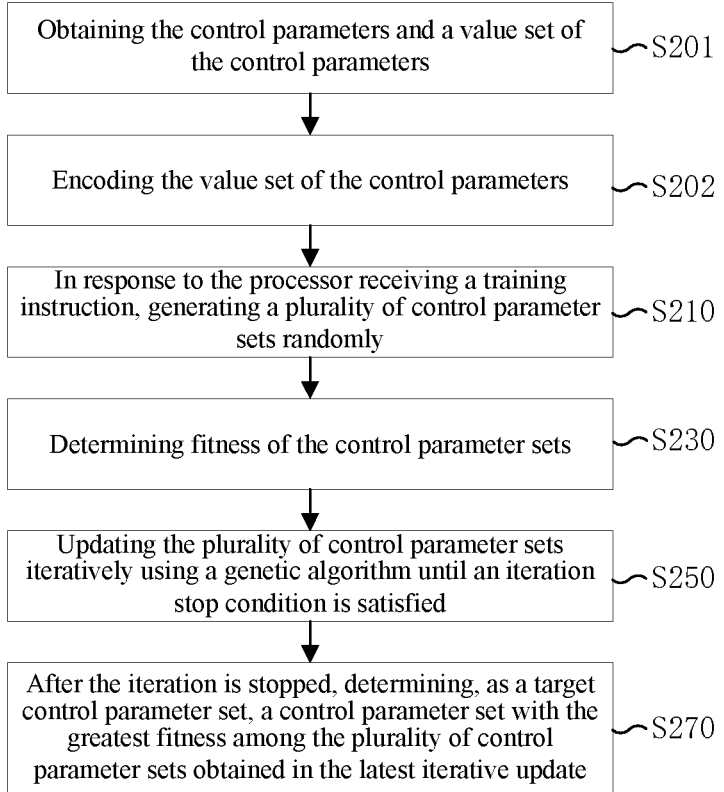

Obtaining the control parameters and a value set of the control parameters ⌇S201

Encoding the value set of the control parameters ⌇S202

In response to the processor receiving a training instruction, generating a plurality of control parameter sets randomly ⌇S210

Determining fitness of the control parameter sets ⌇S230

Updating the plurality of control parameter sets iteratively using a genetic algorithm until an iteration stop condition is satisfied ⌇S250

After the iteration is stopped, determining, as a target control parameter set, a control parameter set with the greatest fitness among the plurality of control parameter sets obtained in the latest iterative update ⌇S270

Fig. 7

| Master drive capability | | | | | | | | | |
|---|---|---|---|---|---|---|---|---|---|
| Actual value | a1 | a2 | a3 | a4 | a5 | a6 | a7 | a8 | a9 |
| Encoded value | 1 | 2 | 3 | 4 | 5 | 6 | 7 | 8 | 9 |

| Particle drive capability | | | | |
|---|---|---|---|---|
| Actual value | b1 | b2 | b3 | b4 |
| Encoded value | 10 | 11 | 12 | 13 |

| Voltage provided by the master | | | | |
|---|---|---|---|---|
| Actual value | c1 | c2 | c3 | c4 |
| Encoded value | 14 | 15 | 16 | 17 |

| On-die termination resistance of the particles | | | | |
|---|---|---|---|---|
| Actual value | d1 | d2 | d3 | d4 |
| Encoded value | 18 | 19 | 20 | 21 |

Fig. 8

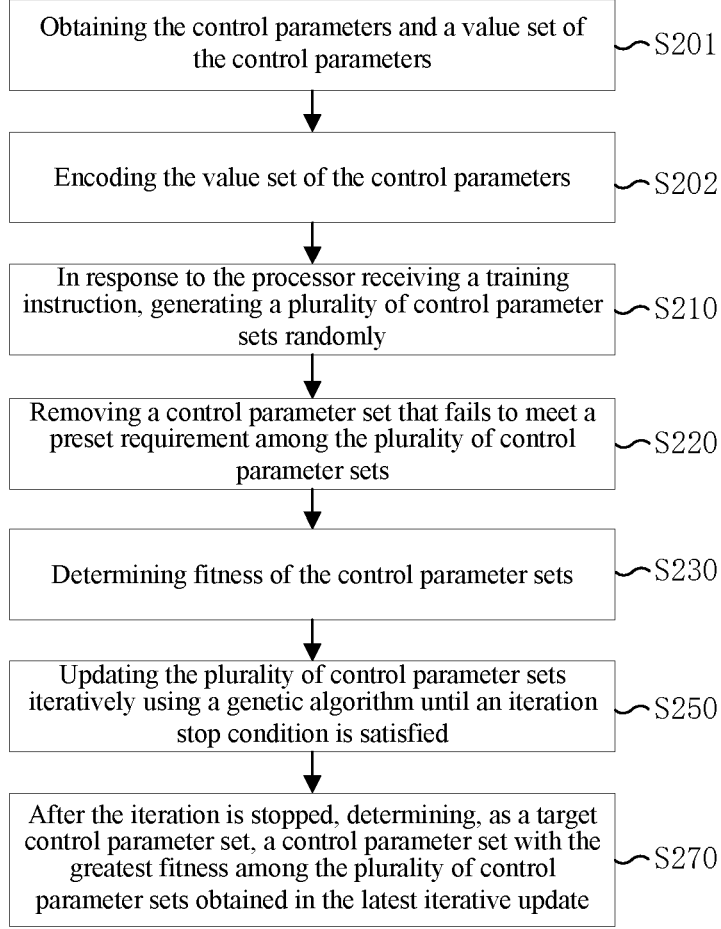

Obtaining the control parameters and a value set of the control parameters — S201

Encoding the value set of the control parameters — S202

In response to the processor receiving a training instruction, generating a plurality of control parameter sets randomly — S210

Removing a control parameter set that fails to meet a preset requirement among the plurality of control parameter sets — S220

Determining fitness of the control parameter sets — S230

Updating the plurality of control parameter sets iteratively using a genetic algorithm until an iteration stop condition is satisfied — S250

After the iteration is stopped, determining, as a target control parameter set, a control parameter set with the greatest fitness among the plurality of control parameter sets obtained in the latest iterative update — S270

Fig. 10

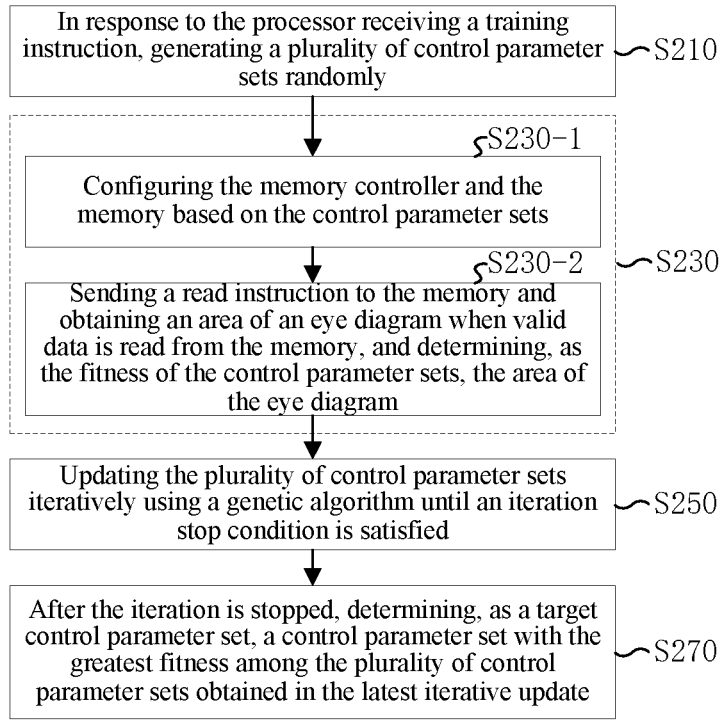

In response to the processor receiving a training instruction, generating a plurality of control parameter sets randomly ⌐S210

S230-1

Configuring the memory controller and the memory based on the control parameter sets

S230-2    S230

Sending a read instruction to the memory and obtaining an area of an eye diagram when valid data is read from the memory, and determining, as the fitness of the control parameter sets, the area of the eye diagram Updating the plurality of control parameter sets iteratively using a genetic algorithm until an iteration stop condition is satisfied ⌐S250

After the iteration is stopped, determining, as a target control parameter set, a control parameter set with the greatest fitness among the plurality of control parameter sets obtained in the latest iterative update ⌐S270

Fig. 11

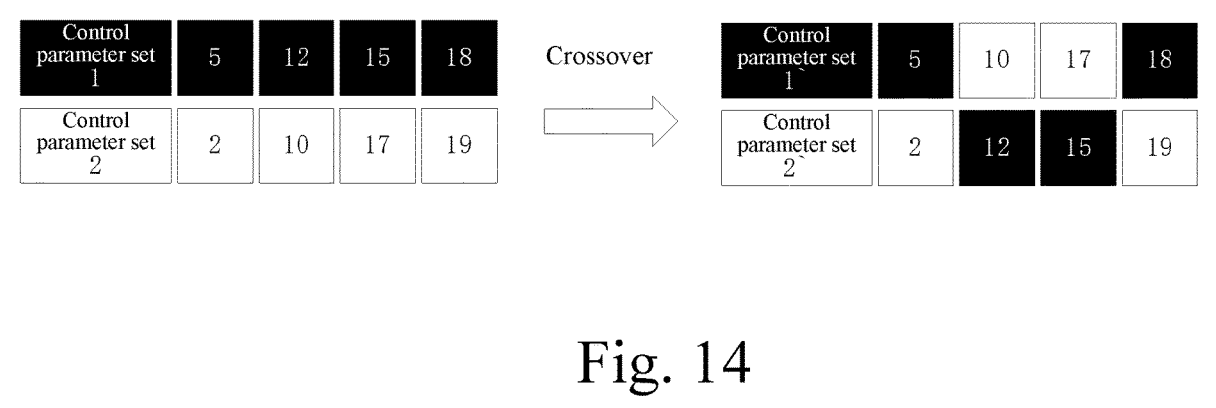

| Control parameter set 1 | 5 | 12 | 15 | 18 |
|---|---|---|---|---|
| Control parameter set 2 | 2 | 10 | 17 | 19 |

Crossover ⟹

| Control parameter set 1 | 5 | 10 | 17 | 18 |
|---|---|---|---|---|
| Control parameter set 2 | 2 | 12 | 15 | 19 |

Fig. 14

OPERATION METHOD OF MEMORY CONTROLLER, MEMORY CONTROLLER AND MEMORY SYSTEM

CROSS-REFERENCE TO RELATED APPLICATIONS

This application is a continuation of International Application No. PCT/CN2023/114773, filed on Aug. 24, 2023, the disclosure of which is hereby incorporated by reference in its entirety.

TECHNICAL FIELD

The present disclosure relates to the field of memory technologies, and in particular, to an operation method of a memory controller, a memory controller and a memory system.

BACKGROUND

In the cases where external conditions change, such as in the cases where the ambient temperature changes, the reliability of data transmission on the bus of a NAND flash memory is reduced, and the number of error bits may increase, affecting the read and write performance of the NAND flash memory.

SUMMARY

Examples of the present disclosure provide an operation method of a memory controller to improve the problem such as a long time required to adjust control parameters related to signal quality of a bus of a NAND flash memory.

In order to achieve the above objects, examples of the present disclosure adopt the following technical solutions.

On the one hand, it is provided an operation method of a memory controller, the memory controller being coupled to a memory and comprising a processor, wherein the method comprises: in response to the processor receiving a training instruction, generating a plurality of control parameter sets randomly, the control parameter sets comprising a plurality of control parameters and being used to adjust signal transmission between the memory controller and the memory; determining fitness of the plurality of control parameter sets; updating the plurality of control parameter sets iteratively using a genetic algorithm until an iteration stop condition is satisfied; and after the iteration is stopped, determining, as a target control parameter set, a control parameter set with the greatest fitness among the plurality of control parameter sets obtained in the latest iterative update.

In accordance with the operation method provided by the example of the present disclosure, when the processor receives a training instruction, a plurality of control parameter sets are generated randomly, the control parameter sets comprising a plurality of control parameters and being used to adjust signal transmission between the memory controller and the memory, that is, adjust the signal transmission quality of a bus. After generating the plurality of control parameter sets, the fitness of the plurality of control parameter sets is evaluated, and the plurality of control parameter sets are updated iteratively using a genetic algorithm. The fitness can indicate the ability of the control parameter sets to solve problems, for example, in the example of the present disclosure, fitness can indicate how well the control parameter sets adjust the signal quality of the bus. When the iteration stop condition is not satisfied, the plurality of control parameter sets are updated iteratively based on a genetic algorithm (such as selection, crossover, and mutation) to generate new control parameter sets until the iteration stop condition is satisfied. After the iteration is stopped, a control parameter set with the greatest fitness among the plurality of control parameter sets obtained in the latest iterative update is determined as the target control parameter set. The memory controller and memory may be configured based on the control parameters in the target control parameter set to ensure the signal quality of the bus.

In some examples, the determining fitness of the control parameter sets comprises: configuring the memory controller and the memory based on the control parameter sets; and sending a read instruction to the memory and obtaining an area of an eye diagram when valid data is read from the memory, and determining, as the fitness of the control parameter sets, the area of the eye diagram.

An eye diagram can be used to evaluate the quality of transmitted signals in digital communication systems. Fitness can indicate how well the control parameter sets fit the environment, that is, how well the signal quality of the bus is adjusted for the solution provided by the example of the present disclosure. Therefore, the size of the area of the eye diagram can be used as the fitness of the control parameter sets. The method provided by the example of the present disclosure configures the memory controller and the memory with the control parameter sets when determining the fitness of the control parameter sets. After the configuration is completed, a read instruction is sent to the memory, and the area of the eye diagram when valid data is read from the memory is obtained. The greater the area of the eye diagram, the higher the quality of the signal. Therefore, in the example of the present disclosure, the area of the eye diagram is determined as the fitness of the control parameter sets, which can evaluate the effect of adjusting the signal transmission quality of the bus according to the control parameter sets better.

In some examples, the sending a read instruction to the memory and obtaining an area of an eye diagram when valid data is read from the memory, and determining, as the fitness of the control parameter sets, the area of the eye diagram comprises: adjusting phases of a rising edge and a falling edge of a data strobe signal DQs repeatedly, and then sending the read instruction to the memory and determining a value range of the phases of the rising edge and the falling edge of the DQs for which the valid data is read; and determining, as the fitness of the control parameter sets, the area of the eye diagram enclosed by the value range of the phases of the rising edge and the falling edge of the DQs for which the valid data is read in a coordinate system, wherein a horizontal axis of the coordinate system is the phase of the rising edge of the DQs, and a vertical axis of the coordinate system is the phase of the falling edge of the DQs.

The data signal is sampled on the rising edge and falling edge of the data strobe signal, and by adjusting the phases of the rising edge and falling edge of the data strobe signal, the range of the phases of the rising edge and falling edge of the data strobe signal when valid data can be read is found. The size of the area of the eye diagram enclosed by the value range of the phases of the rising edge and the falling edge of the data strobe signal in a coordinate system is determined as the fitness of the control parameter sets, wherein the size of the area of the eye diagram herein can be approximately considered as the product of the phase value range of the rising edge of the data strobe signal in which the data signal can be effectively sampled and the phase value range of the falling edge in which the data signal can be effectively sampled. The broader the phase value range of the rising edge of the data strobe signal in which the data signal can be effectively sampled and the phase value range of the falling edge in which the data signal can be effectively sampled, the broader the range in which the valid data can be read, the greater the area of the eye diagram, and the better the signal transmission quality of the bus.

In some examples, the method further comprises, before the determining fitness of the control parameter sets: removing a control parameter set that fails to meet a preset requirement among the plurality of control parameter sets.

The control parameter set that fails to meet the preset requirement herein may include repeated control parameter sets or control parameter sets having a plurality of control parameters with contradictions or conflicts therebetween, etc. Since the above plurality of control parameter sets are randomly generated, different control parameter sets may have same control parameters, and thus repeated control parameter sets need to be removed. On the other hand, because the control parameter sets are randomly generated, there may be conflicts or contradictions among different control parameter sets of the control parameter sets. In a possible example, control parameter sets that have contradictions or conflicts therebetween can be stored in advance, and after the plurality of control parameter sets are generated randomly, the randomly generated control parameter set can be matched with the control parameter sets that have contradictions or conflicts therebetween stored in advance. If the two match, it indicates that the control parameter sets do not meet the requirements, and the control parameter sets may be removed.

In some examples, the updating the plurality of control parameter sets iteratively using a genetic algorithm comprises: selecting a plurality of control parameter sets on which a crossover operation is to be performed based on the fitness of the control parameter sets; and performing a genetic crossover on any two control parameter sets among the plurality of control parameter sets on which the crossover operation is to be performed using the genetic algorithm.

Selection and crossover are commonly used operations in genetic algorithms. The selection operation can select a control parameter set with higher fitness among the plurality of control parameter sets. The higher the fitness of the control parameter set, the greater the probability of being selected. There are many implementation for selection operations, such as the roulette selection method. The selected plurality of control parameter sets can also be referred to as the control parameter sets on which a crossover operation is to be performed, and a genetic crossover is performed on any two control parameter sets among the plurality of control parameter sets on which the crossover operation is to be performed using the genetic algorithm. The selection operation is to select excellent control parameter sets among the plurality of control parameter sets, while the crossover operation is to interchange a part of the control parameters in the plurality of excellent control parameter sets to generate new control parameter sets.

In some examples, the updating the plurality of control parameter sets iteratively using a genetic algorithm further comprises: performing a genetic mutation on the control parameter sets on which the crossover operation has been performed using the genetic algorithm.

In addition to selection and crossover, mutation is also a commonly used operation in genetic algorithms. Mutation can be combined with selection and crossover to improve the effectiveness of the genetic algorithm, enhance the search ability of the genetic algorithm, and maintain the diversity of the group.

In some examples, the selecting a plurality of control parameter sets on which a crossover operation is to be performed based on the fitness of the control parameter sets comprises: determining a probability of each of the control parameter sets being selected, the probability of being selected being a ratio of the fitness of the control parameter set to a sum of the fitness of all the control parameter sets; and setting a random number between 0 and 100%, and selecting, as the control parameter set on which the crossover operation is to be performed, the control parameter set whose probability of being selected is greater than the random number.

In some examples, the performing a genetic crossover on any two control parameter sets among the plurality of control parameter sets on which the crossover operation is to be performed using the genetic algorithm comprises: selecting a starting position and an interchange length randomly for any two of the control parameter sets on which the crossover operation is to be performed, and interchanging a part of the control parameters of the two of the control parameter sets on which the crossover operation is to be performed to generate the control parameter sets on which the crossover operation has been performed.

In some examples, the performing a genetic mutation on the control parameter sets on which the crossover operation has been performed using the genetic algorithm comprises: for any of the control parameter sets on which the crossover operation has been performed, replacing a random control parameter in the control parameter set with any other value in a value set of the control parameter according to a set mutation probability. For example, a control parameter set comprises a master drive capability, which is 75 ohms in this control parameter set. The value set of the master drive capability further comprises possible values such as 50 ohms, 30 ohms, 25 ohms, and 19 ohms. Mutation refers to replacing the value of 75 ohms with other values.

In some examples, the iteration stop condition comprises: the fitness of the control parameter sets reaches a set value, or a total number of the filtered control parameter sets reaches a first preset number, wherein the first preset number satisfies:

$$n = \frac{t}{2k \cdot (l/v)} \cdot m$$

wherein n is the first preset number, t is a calibration time length specified in a specification, l is a length of bytes transmitted, v is a rate of a bus, k is an average of the number of times values of the phases of the rising edge and the falling edge of the DQs are adjusted, and m is a number of channels of the memory.

In some examples, the method further comprises, before the generating a plurality of control parameter sets randomly: obtaining the control parameters and a value set of the control parameters, wherein the value set of the control parameters comprises a plurality of values of the control parameters; and encoding the value set of the control parameters.

Encoding is a prerequisite for genetic algorithms, which encodes the value set of the plurality of control parameters. The encoding method can be binary encoding, real number encoding, etc. For the memory system, these control parameters will not change, and thus the value set of these control parameters can be encoded in advance. When the processor receives a training instruction, a plurality of control parameter sets are generated randomly based on the encoded value set of the control parameters.

In a second aspect, it is provided a memory controller, comprising: a flash memory interface circuit coupled to a memory; and a processor coupled to the flash memory interface circuit, wherein the processor is configured to: in response to receiving a training instruction, generate a plurality of control parameter sets randomly, the control parameter sets being used to adjust a size of an eye diagram for signal transmission between the memory controller and the memory. The processor is further configured to: determine fitness of the control parameter sets. The processor is further configured to: update the plurality of control parameter sets iteratively using a genetic algorithm until an iteration stop condition is satisfied. The processor is further configured to: after the iteration is stopped, determine, as a target control parameter set, a control parameter set with the greatest fitness among the plurality of control parameter sets obtained in the latest iterative update.

In some examples, the processor is further configured to: configure the memory controller and the memory based on the control parameter sets. The processor is further configured to: send a read instruction to the memory via the flash memory interface circuit and obtain an area of an eye diagram when valid data is read from the memory, and determine, as the fitness of the control parameter sets, the area of the eye diagram.

In some examples, the processor is configured to: adjust phases of a rising edge and a falling edge of a data strobe signal DQs repeatedly, and then send the read instruction to the memory and determine a value range of the phases of the rising edge and the falling edge of the DQs for which the valid data is read; and determine, as the fitness of the control parameter sets, the area of the eye diagram enclosed by the value range of the phases of the rising edge and the falling edge of the DQs for which the valid data is read in a coordinate system, wherein a horizontal axis of the coordinate system is the phase of the rising edge of the DQs, and a vertical axis of the coordinate system is the phase of the falling edge of the DQs.

In some examples, the processor is further configured to: before the determining fitness of the control parameter sets, remove a control parameter set that fails to meet a preset requirement among the plurality of control parameter sets.

In some examples, the processor is configured to: select a plurality of control parameter sets on which a crossover operation is to be performed based on the fitness of the control parameter sets; and perform a genetic crossover on any two control parameter sets among the plurality of control parameter sets on which the crossover operation is to be performed using the genetic algorithm.

In some examples, the processor is further configured to: perform a genetic mutation on the control parameter sets on which the crossover operation has been performed using the genetic algorithm.

In some examples, the processor is configured to: determine a probability of each of the control parameter sets being selected, the probability of being selected being a ratio of the fitness of the control parameter set to a sum of the fitness of all the control parameter sets; and set a random number between 0 and 100%, and select, as the control parameter set on which the crossover operation is to be performed, the control parameter set whose probability of being selected is greater than the random number.

In some examples, the processor is configured to: select a starting position and an interchange length randomly for any two of the control parameter sets on which the crossover operation is to be performed, and interchange a part of the control parameters of the two of the control parameter sets on which the crossover operation is to be performed to generate the control parameter sets on which the crossover operation has been performed.

In some examples, the processor is configured to: for any of the control parameter sets on which the crossover operation has been performed, replace a random control parameter in the control parameter set with any other value in a value set of the control parameter according to a set mutation probability.

In some examples, the iteration stop condition comprises: the fitness of the control parameter sets reaches a set value, or a total number of the filtered control parameter sets reaches a first preset number, wherein the first preset number satisfies:

$$n = \frac{t}{2k \cdot (l/v)} \cdot m$$

wherein n is the first preset number, t is a calibration time length specified in a specification, l is a length of bytes transmitted, v is a rate of a bus, k is an average of the number of times values of the phases of the rising edge and the falling edge of the DQs are adjusted, and m is a number of channels of the memory.

In a third aspect, a memory system is provided. The memory system includes a memory and a memory controller. The memory controller is connected to the memory via a flash memory interface circuit, and the memory controller is the memory controller provided in any example of the second aspect.

In a fourth aspect, an electronic device is provided. The electronic device includes a host and the memory system as provided in the third aspect. The host is connected to the memory system to write data into the memory system or read data stored in the memory system.

It can be understood that the beneficial effects that can be achieved by the memory controller, memory system and electronic device as provided by the above examples of the present disclosure can refer to those described above with respect to the operation method of the memory controller, and will not be repeated herein.

BRIEF DESCRIPTION OF THE DRAWINGS

FIG. 6 is a schematic flowchart of a method according to an example of the present disclosure;

FIG. 7 is a schematic flowchart of another method according to an example of the present disclosure;

US 12,681,665 B2

7

Figure 9:
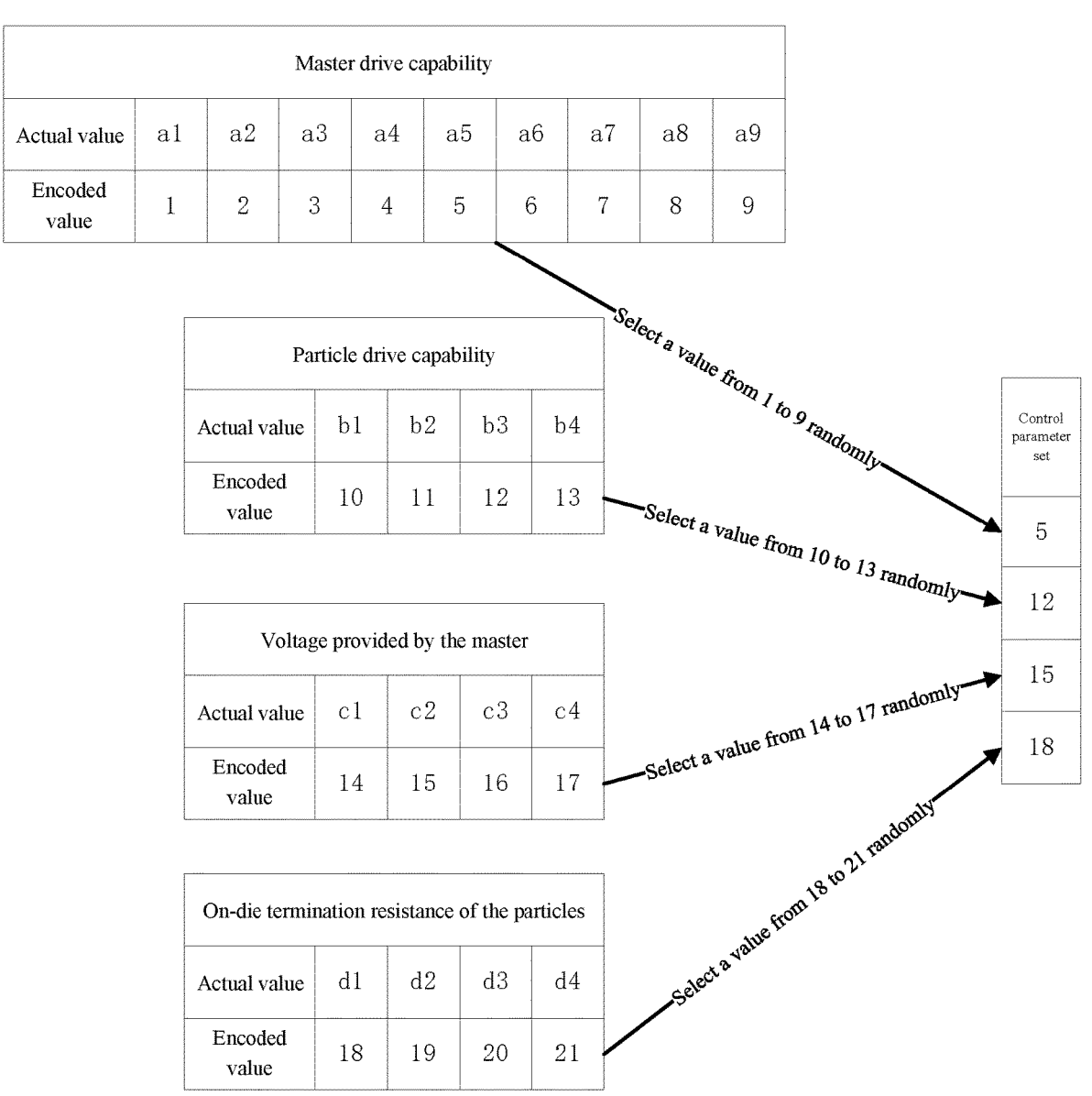
Figure 12:
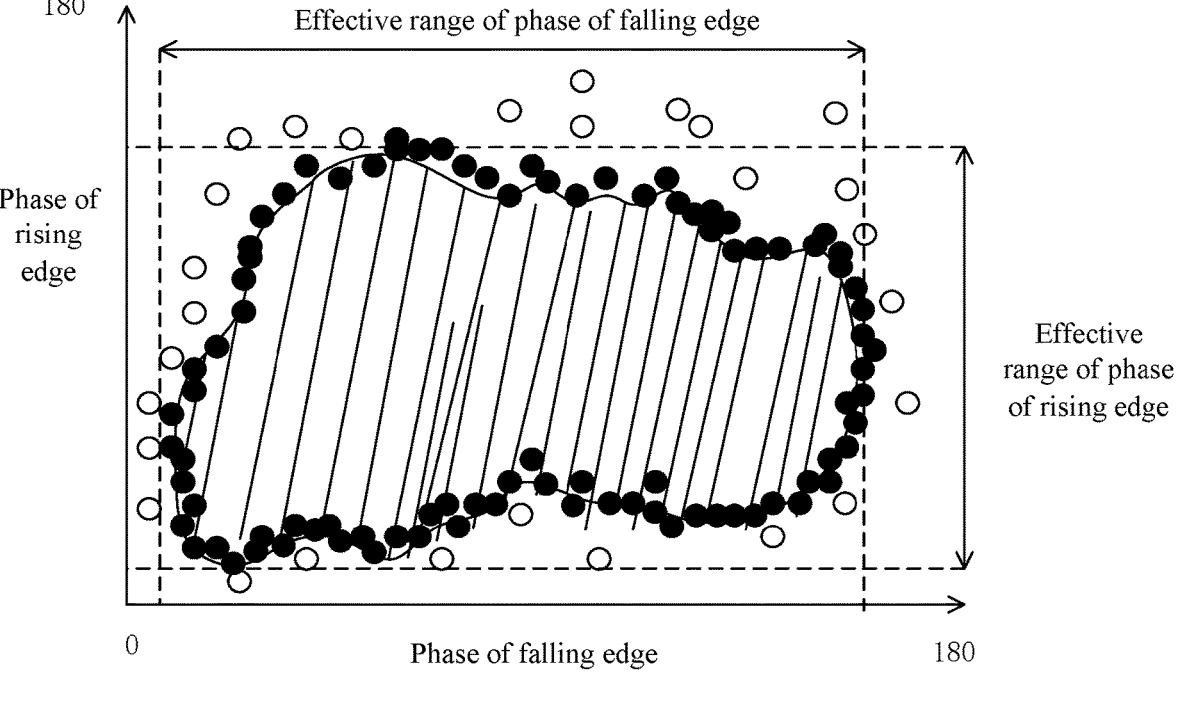
Figure 13:
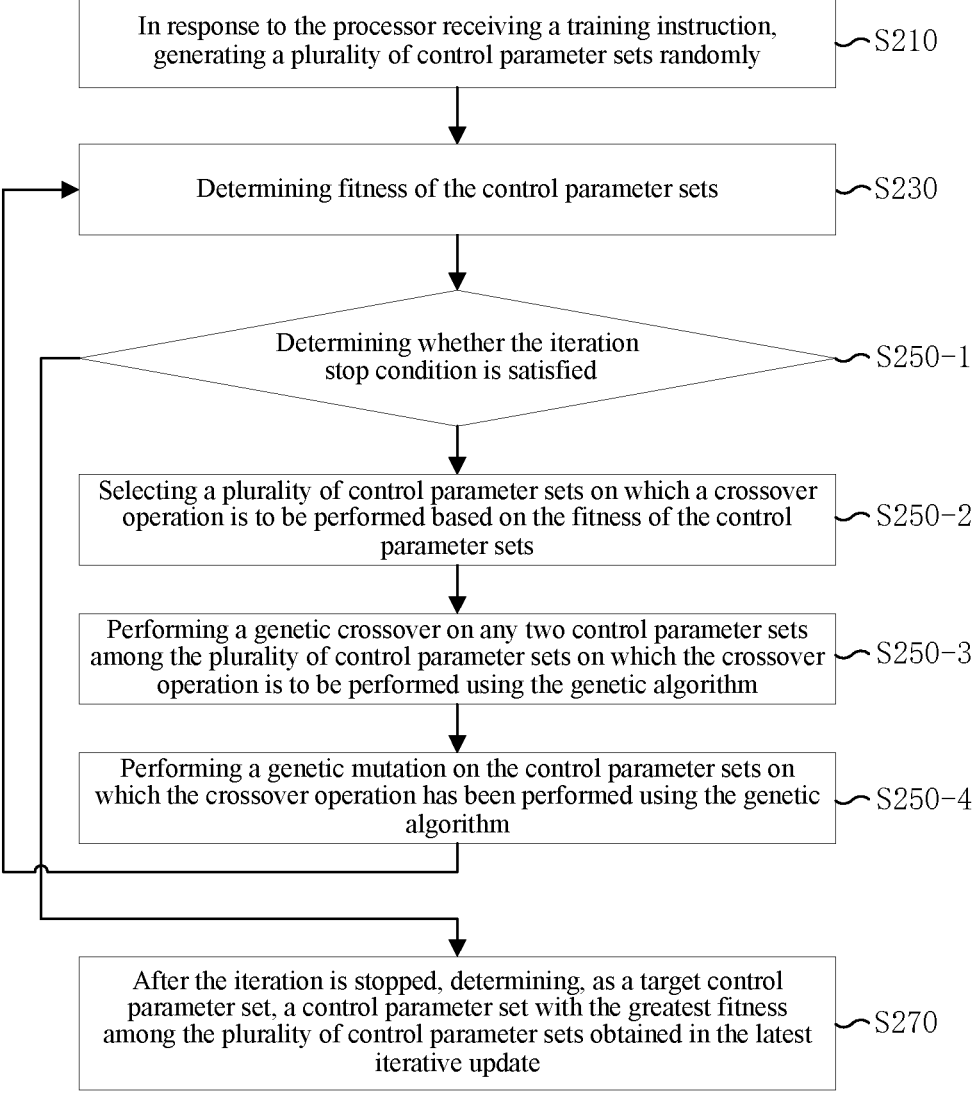
Figure 15:
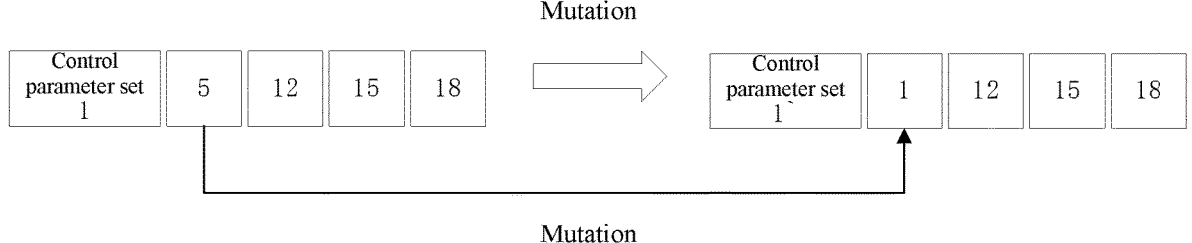

FIG. 8 is a schematic diagram of encoding of control parameters according to an example of the present disclosure;

FIG. 9 is a schematic diagram of random generation of a control parameter set according to an example of the present disclosure;

FIG. 10 is a schematic flowchart of another method according to an example of the present disclosure;

FIG. 11 is a schematic flow chart of another method according to an example of the present disclosure;

FIG. 12 is a schematic diagram of determination of an area of an eye diagram according to an example of the present disclosure;

FIG. 13 is a schematic flowchart of another method according to an example of the present disclosure;

FIG. 14 is a schematic diagram of a crossover according to an example of the present disclosure; and FIG. 15 is a schematic diagram of a mutation according to an example of the present disclosure.

DETAILED DESCRIPTION

The technical solutions in some examples of the present disclosure will be clearly and completely described below with reference to the accompanying drawings. Obviously, the described examples are only some of the examples of the present disclosure, rather than all of the examples. Based on the examples provided by this disclosure, all other examples obtained by those of ordinary skill in the art fall within the scope of protection of this disclosure.

Examples of the present disclosure provide an electronic device, for example, any one of a cell phone, a desktop computer, a tablet computer, a laptop, a server, a vehicle-mounted device, a wearable device (such as a smart watch, a smart bracelet, smart glasses, etc.), a mobile power supply, a game console, a digital multimedia player, etc.

Figure 1:
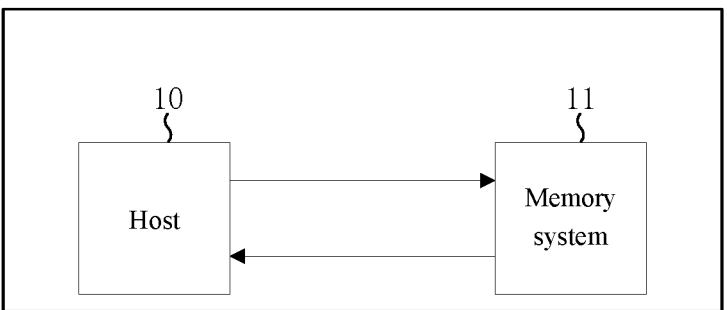
FIG. 1 is a schematic diagram of an electronic device according to an example of the present disclosure.

Referring to FIG. 1, which shows a schematic diagram of an electronic device according to an example of the present disclosure, the electronic device includes a host 10 and a memory system 11. The host 10 is coupled to the memory system 11 to write data into the memory system 11 or read data stored in the memory system. 11. The host is also referred to as a master device, and the memory system is also referred to as a slave device.

The electronic device may include one or more hosts 10 and may also include one or more memory systems 11. The memory system can be accessed by different hosts. For example, if the electronic device is a cell phone, the central processing unit (CPU), graphics processing unit (GPU), digital signal processor (DSP), etc., of the cell phone, may all access the memory system as a host.

The memory system 11 may be integrated into various types of memory devices, for example, may be included in the same package (e.g., universal flash storage (UFS) package or embedded multimedia card (eMMC) package). On this basis, the memory system 11 can be applied to and packaged into different types of electronic products, such as mobile phones (such as cell phones), desktop computers, tablet computers, laptops, servers, vehicle-mounted devices, game consoles, printers, positioning devices, wearable devices, smart sensors, mobile power supplies, virtual reality (VR) devices, augmented reality (AR) devices or any other suitable electronic device having storage therein.

Figure 2:
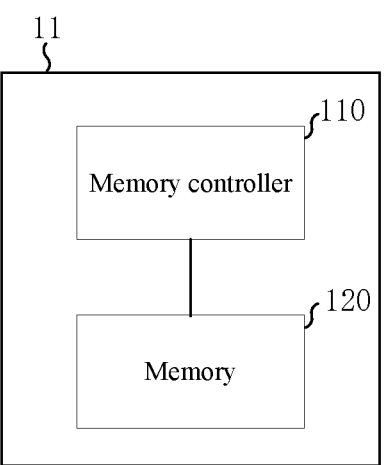
FIG. 2 is a schematic diagram of a memory system according to an example of the present disclosure.

As an example, referring to FIG. 2, which shows a schematic diagram of a memory system 11 according to an example of the present disclosure, the memory system 11 includes a memory controller 110 and a memory 120. The memory controller 110 is also referred to as a master. The memory controller 110 is coupled to the memory 120 to control the memory 120 to store data. The memory 120 may be a two-dimensional (2D) memory or a three-dimensional (3D) memory.

In some examples, the memory system 11 includes the memory controller 110 and one or more memories 120, and the memory system 11 may be integrated into a memory card.

Memory cards include any one of personal computer memory card international association (PCMCIA) cards (abbreviated as PC cards), compact flash (CF) cards, smart media (SM) cards, memory sticks, multimedia cards (MMC), secure digital memory card (SD) cards, and UFS.

Figure 3:
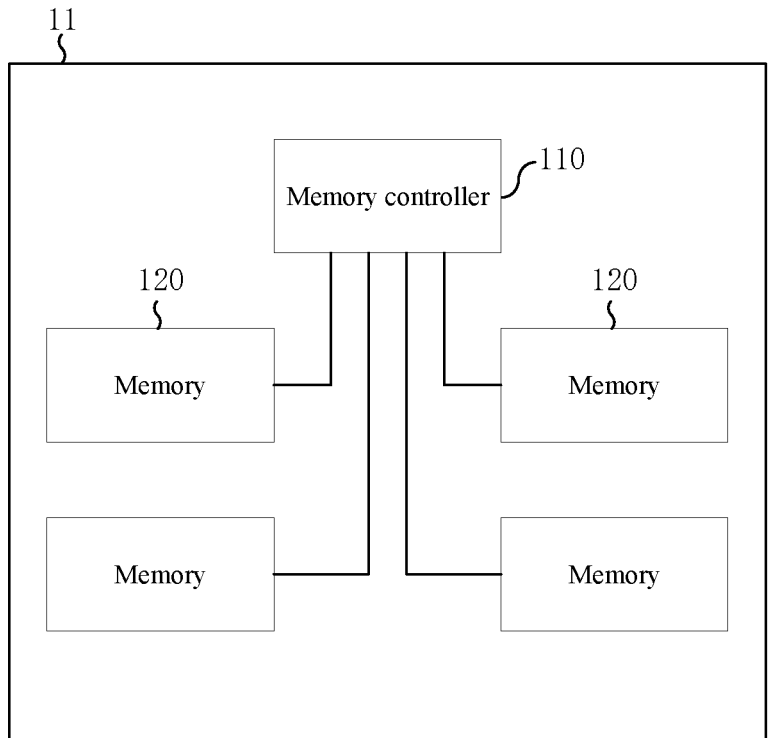
FIG. 3 is a schematic diagram of another memory system according to an example of the present disclosure.

In other examples, referring to FIG. 3, the memory system 11 includes a memory controller 110 and a plurality of memories 120, and the memory system 11 can be integrated into solid state drives (SSDs).

In some examples, the memory controller 110 is configured to operate in a low duty-cycle environment, such as an SD card, a CF card, a universal serial bus (USB) flash drive, or other media for use in electronic devices such as personal computers, digital cameras, and mobile phones.

In other examples, the memory controller 110 is configured to operate in a high duty-cycle environment SSD or eMMC used for data storage in mobile devices such as smartphones, tablets, laptops, and enterprises storage array.

In some examples, the memory controller 110 may be configured to manage data stored in memory 120 and communicate with external devices (e.g., host 10). In some examples, the memory controller 110 may also be configured to control operations of memory 120, such as read, erase, and program operations. In some examples, the memory controller 110 may also be configured to manage various functions regarding data stored or to be stored in memory 120, including at least one of bad block management, garbage collection (GC), logical to physical address translation and wear leveling. In some examples, the memory controller 110 is further configured to process error correction codes regarding data read from or written into the memory 120.

Of course, the memory controller 110 can also perform any other suitable functions, such as training the signal transmission quality of a bus between the memory controller 110 and the memory 120 as provided by the examples of the present disclosure.

As an example, the memory 120 is configured to store data in a non-volatile manner, and a plurality of memories 120 can operate or work independently of each other.

Figure 4:
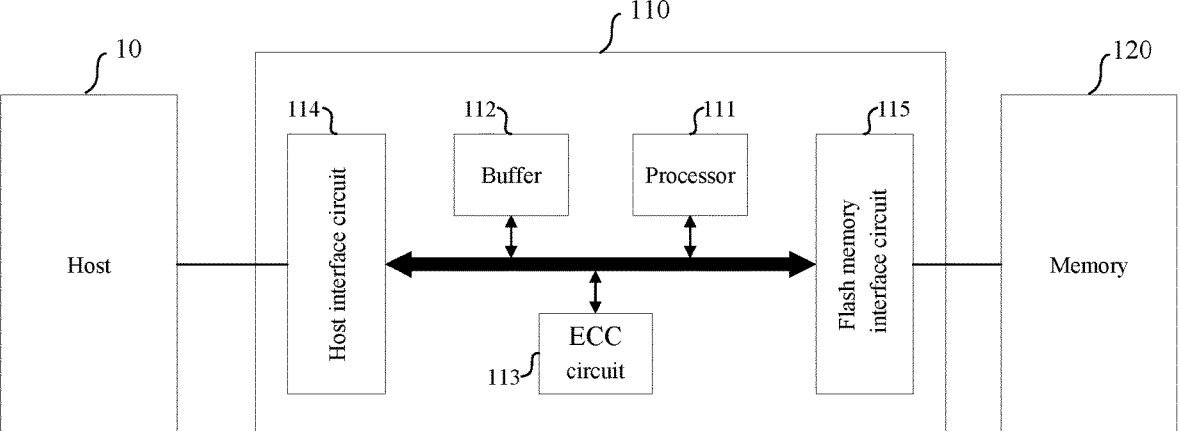
FIG. 4 is a schematic diagram of a memory controller according to an example of the present disclosure.

FIG. 4 shows a schematic diagram of a memory controller 110 provided by an example of the present disclosure. The memory controller 110 may include a processor 111, a buffer 112, an error correction code (ECC) circuit 113, a host interface circuit 114 and a flash memory interface circuit 115.

The processor 111 may communicate with the host 10 via the host interface circuit 114 and perform logic operations to control the operation of the memory controller 110. For example, the processor 111 may load programming commands, data files, or data structures, perform various operations, or generate commands and addresses in response to requests received from the host 10 or external devices. For example, the processor 111 may generate various commands for performing program operations, read operations, erase operations, and parameter setting operations. In some possible examples, the processor 111 may generate commands without a request from the host 10. For example, the processor 111 may generate commands for background operations such as garbage collection operations of the memory 120. Alternatively, the processor 111 may also generate commands for training the signal transmission quality of a bus between the memory controller 110 and the memory 120.

The ECC circuit 113 may perform error detection and correction functions on the read data read from the memory 120. For example, the ECC circuit 113 may generate parity check bits for write data to be written into the memory 120, and the generated parity check bits may be stored in the memory 120 together with the write data. When data is read from the memory 120, the ECC circuit 113 may correct errors in read data using the parity check bits read from the memory 120 together with the read data, and may output the error-corrected read data.

The host interface circuit 114 may send data or commands to or receive data or commands from the host 10, for example, commands, data to be written into the memory 120, and the like sent from the host 10 to the host interface circuit 114, and responses to commands, data to be read from the memory 120, and the like sent to the host 10 from the host interface circuit 114. The host interface circuit 114 may also include protocols for interchanging data between host 10 and memory controller 110. For example, the host interface circuit 114 may communicate with the host 10 via at least one of various interface protocols such as: Universal Serial Bus (USB) protocol, Microsoft Management Console (MMC) protocol, peripheral component interconnect (PCI) protocol, peripheral component interconnect express (PCI-E) protocol, advanced technology attachment (ATA) protocol, serial ATA protocol, parallel ATA protocol, small computer system interface (SCSI) protocol, enhanced small disk interface (ESDI) protocol, integrated drive electronics (IDE) protocol, FireWire protocol, etc.

The flash memory interface circuit 115 can communicate with the memory 120 using a communication protocol under the control of the processor 111, including communication of commands, addresses, and data. The flash memory interface circuit 115 can send data to be written into the memory 120 to the memory 120, or can receive data to be read from the memory 120. The flash memory interface circuit 115 may be implemented to comply with a standard protocol such as Toggle or Open NAND Flash Interface (ONFI). For example, taking the ONFI protocol as an example, the memory controller 110 can be connected to the memory 120 via the ONFI bus.

In some examples, an 8-bit bus is referred to as a channel (CH). The memory system 11 may support a plurality of channels, and a plurality of memories 120 may be connected to the memory controller 110 via a plurality of channels CH1 to CHp.

Figure 5:
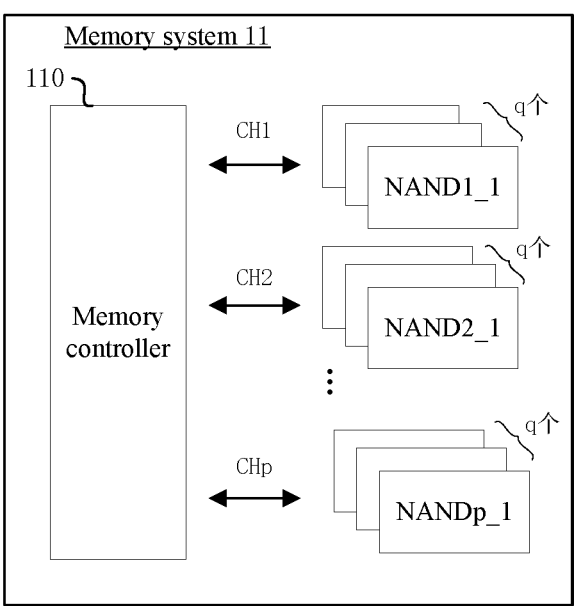
FIG. 5 is a schematic diagram of a connection between a memory controller and a memory according to an example of the present disclosure.

For example, in conjunction with FIG. 5, NAND1_1 to NAND1_*q* can be connected to the memory controller 110 via the channel CH1, NAND2_1 to NAND2_*q* can be connected to the memory controller 110 via the channel CH2, . . . , and NANDp_1 to NANDp_q can be connected to the memory controller 110 via the channel CHp, and so on.

As an example, the memory controller 110 may be connected to at least one memory 120 via a plurality of control pins that are configured to send control signals (e.g., command latch enable (CLE) signal, address latch enable (ALE) signal, chip enable (CE) signal, write enable (WE) signal, and read enable (RE) signal). Furthermore, the memory controller 110 may be implemented to control the memory 120 using control signals. For example, the memory 120 may latch the command CMD or the address ADD at the edge of the WE signal according to the CLE signal and the ALE signal to perform a program operation, a read operation, or an erase operation. For example, the CE signal may be activated during a read operation, the CLE signal may be activated during a command transmission period, the ALE signal may be activated during an address transmission period, and the RE signal may be triggered during a period when data is sent via the data signal DQ pin. The data strobe signal DQs can be triggered at a frequency corresponding to the data input/output speed, and the read data can be sequentially sent in synchronization with the data strobe signal DQs.

However, the quality of the signals transmitted over the bus may be affected by environmental factors. For example, in the case of temperature changes, the quality of the signals transmitted over the bus may be degraded. For example, reading and writing across temperatures, that is, writing at a high-temperature and reading at a low-temperature, or writing at a low-temperature and reading at a high-temperature, will result in a higher bit error rate. Increased bit error rates may require rereading for error correction, affecting the read and write performance of the memory system. Temperature changes will affect the performance of the memory system, for example, causing an increase in error bits in data transmission over the bus between the memory controller and the memory, which may even exceed the error correction limit of the ECC circuit 113 of the memory controller 110. When the hardware design has been fixed, relevant control parameters, for example, master drive capability, particle drive capability, voltage provided by the master and on-die termination (ODT) resistance of the particles, etc., need to be adjusted to improve signal quality. For example, these parameters are adjusted, and then the quality of signal transmission over the bus is detected. After multiple adjustments, the values of each control parameter that correspond to the best signal quality in the process of adjusting the control parameter values multiple times may be found. In this way, the optimal value of the control parameter can be determined, and the quality of the signal transmission of the bus between the memory controller and the memory is guaranteed when external conditions change.

However, there are many relevant control parameters that can adjust signal quality, and each of them has a large value range. If a global traversal method is adopted, it will take a long time to continuously train the signal quality to ensure the reliability of data transmission when external conditions change. Although this method can match appropriate control parameters, it requires a greater time cost.

To improve the above problems, examples of the present disclosure provide an operation method of a memory controller, which determines the values of relevant control parameters based on a genetic algorithm to adjust the quality of the signal transmission of the bus between the memory controller and the memory.

Genetic algorithm draws on biological evolution theory and is a stochastic global search and optimization method developed by imitating the biological evolution mechanism of nature. According to the theory of biological evolution, in the ever-changing natural environment, individuals with strong adaptability to the environment have a greater chance of survival, while individuals that cannot adapt to the environment are gradually eliminated. Individuals with good adaptability pass on good genetic characteristics to their offspring through genetic mechanisms, and in the process of adapting to the environment, individuals mutate, making them develop in a direction that is conducive to adapting to the environment. The genetic algorithm is an imitation of this evolution mechanism. By drawing lessons from the biological evolution mechanism, the genetic algorithm simulates the evolutionary process of organisms to find the optimal solution for the research object. The genetic algorithm encodes the feasible solutions to the problem into chromosomes through the encoding mechanism, and generates new populations through the filtering of fitness functions and operations similar to selection, crossover, and mutation in nature. In this way, repeated evolutions gradually increase the fitness of individuals in the group, until certain conditions are satisfied and the optimal solution is obtained.

Before introducing the solutions provided by the examples of the present disclosure in detail, the terms related to genetic algorithms are briefly explained.

Chromosomes: Chromosomes can also be referred to as individuals. A certain number of individuals form a group. The group is also referred to as a population. The number of individuals in the group is referred to as the group size.

Gene: A gene is an element in the chromosome or individual that represents the characteristics of the individual. For example, if there is an individual S=(1, 0, 1, 1), then the four elements 1, 0, 1, and 1 are referred to as genes respectively.

Fitness: The degree of adaptation of each individual to the environment is referred to as fitness. In order to reflect the adaptability of the individual, a function that can measure each chromosome in the problem is introduced, referred to as a fitness function. This function is used to calculate the probability that an individual is used in a group.

As an example, examples of the present disclosure provide an operation method of a memory controller. The memory controller is coupled to a memory. Referring to FIG. 6, the method includes:

S210: In response to the processor receiving a training instruction, generating a plurality of control parameter sets randomly. The control parameter sets include a plurality of control parameters. The control parameter sets are used to adjust signal transmission between the memory controller and the memory.

After the processor receiving the training instructions, a plurality of control parameter sets are generated randomly, the control parameter sets comprising a plurality of control parameters and being used to adjust signal transmission between the memory controller and the memory, that is, adjust the quality of the signal transmission between the memory controller and the memory.

The training instruction herein may be sent by the host, or may be generated automatically by the processor when the ECC circuit cannot correct errors normally.

S230: Determining fitness of the control parameter sets.

The genetic algorithm uses the fitness to evaluate an individual's adaptability to the environment. In the example of the present disclosure, fitness is used to evaluate the effect of the control parameter set to adjust the quality of signal transmission between the memory controller and the memory. As an example, examples of the present disclosure can use the control parameters in the control parameter set to configure the memory controller and the memory, and obtain the size of the area of an eye diagram for the signal transmission between the memory controller and the memory after the configuration is completed. Since the size of the area of the eye diagram may be used to measure the quality of signal transmission, examples of the present disclosure can use the size of the area of the eye diagram for the signal transmission between the memory controller and the memory after completing the control parameter configuration in the control parameter set as the fitness of the control parameter sets.

S250: Updating the plurality of control parameter sets iteratively using a genetic algorithm until an iteration stop condition is satisfied.

Genetic algorithms are used to update the plurality of randomly generated control parameter sets iteratively, fitness is used to filter the control parameter sets, and the next generation control parameter set is obtained through genetic operations such as selection, crossover, and mutation. Then, the fitness is used to filter the control parameter set obtained by genetic iteration, and continue to obtain the next generation of control parameter set through genetic operations such as selection, crossover, and mutation. In this way, the control parameter sets are updated iteratively based on the genetic algorithm and the iteration is stopped until the iteration stop condition is satisfied.

S270: After the iteration is stopped, determining, as a target control parameter set, a control parameter set with the greatest fitness among the plurality of control parameter sets obtained in the latest iterative update.

After the iteration is stopped, the control parameter set with the largest fitness among the plurality of control parameter sets obtained in the latest iterative update is determined as the target control parameter set. The largest fitness means that the control parameter set is the optimal solution to the problem. The memory controller and the memory are configured based on the control parameters in the target control parameter set, which can avoid the degradation of the quality of signal transmission between the memory controller and the memory.

The solution provided by the example of the present disclosure uses a genetic algorithm to search for control parameters that can adjust the quality of the signal transmission of the bus between the memory controller and the memory. The quality of the signal transmitted over the bus between the memory controller and the memory can be trained when the environmental conditions change or a training instruction is received to determine the control parameters that can adjust the quality of the signal transmission of the bus between the memory controller and the memory to be optimal, so as to ensure that the quality of the signal transmission of the bus between the memory controller and the memory has better adaptability. The quality of the signal transmission of the bus between the memory controller and the memory are ensured under various environmental conditions.

For example, there are many parameters that can adjust the quality of the signal transmission of the bus between the memory controller and the memory. With reference to FIG. 7, before operation S210, the method provided by the example of the present disclosure further includes:

S201: Obtaining the control parameter and a value set of the control parameters.

S202: Encoding the value set of the control parameters.

For example, the control parameter is to adjust the size of the eye diagram for signal transmission between the memory controller and the memory, and the size of the eye diagram can be used to indicate the quality of the signal transmission between the memory controller and the memory. For example, the control parameters and the value set of the control parameters can be obtained from the read-only memory or other storage space of the memory controller. In some other possible examples, the relevant control parameters and the value set of the control parameters may also be obtained from the host via the host interface circuit.

For example, taking the control parameters of the master drive capability, the particle drive capability, the voltage provided by the master, and the on-die termination resistance of the particles as examples, these control parameters and their value sets are introduced below.

In some examples, the value set of each control parameter includes multiple values. For example, taking the master drive capability as an example, the master drive capability is a resistance value, and adjustment of the control parameter involves adjustment of the driving voltage value of the master. The greater the resistance value, the greater the voltage value. The master drive capability includes the following possible values, as shown in Table 1:

TABLE 1

| 0 h | not used (high impedance state) |
|---|---|
| 1 h | 150Ω |
| 2 h | 75Ω |
| 3 h | 50Ω |
| 4 h | 37.5Ω |
| 5 h | 30Ω |
| 6 h | 25Ω |
| 7 h | 21.5Ω |
| 8 h | 19Ω |

Combined with Table 1, with respect to the control parameter of master drive capability, Table 1 shows the value set of this control parameter, such as 150Ω, 75Ω, etc. The elements in the value set of the control parameter are the actual values of the control parameters.

As for particle drive ability, the function of adjusting this control parameter is to adjust the driving voltage value of the master. The greater the resistance value, the greater the voltage value. The driving capabilities of particles include the following possible values: 18Ω; 25Ω; 37.5Ω; 50Ω, etc.

For the voltage provided by the master, see Table 2 for example:

TABLE 2

| Timing Mode NVDDR3 Vccq = 1.8 V | Adjustable Range 22%~45% |
|---|---|
| Timing Mode NVDDR4 Vccq = 1.2 V | Adjustable Range 10%~30% |

For the on-die termination resistance of particles, see Table 3 for example:

TABLE 3

| Timing Mode NVDDR3 | 150 Ω, 100 Ω, 75 Ω, 50 Ω |
|---|---|
| Timing Mode NVDDR4 | 300 Ω, 150 Ω, 100 Ω, 75 Ω, 60 Ω, 50 Ω |

The above only uses some examples to illustrate the possible values of the control parameters such as the master drive capability, the particle drive capability, the voltage provided by the master, and the on-die termination resistance of the particles, but not a limitation on these control parameters. In different application scenarios, the above control parameters may also include other values, or may also include other control parameters that can adjust signal transmission.

In a possible example, the value set of the above control parameters can also be encoded to facilitate processing and calculation. The coding mechanism is a prerequisite for the genetic algorithm. Instead of directly searching for the research object (such as the actual value of the control parameter mentioned in the previous example), the genetic algorithm first converts the research object into gene strings, i.e., chromosome individuals, that are obtained by arranging corresponding symbols according to a certain order based on a certain encoding mechanism. These encoded strings constitute a feasible solution to the problem. This conversion process is chromosome encoding and is the key of genetic algorithms. Currently, commonly used encoding mechanisms include binary encoding and real number encoding. The examples of the present disclosure are set forth by taking real number encoding as an example.

For example, with reference to FIG. 8, for the sake of simple explanation, the value set of the master drive capability is expressed briefly as (a1, a2, a3, a4, a5, a6, a7, a8, a9), which respectively correspond to the actual values of the control parameters shown in Table 1. These values are the actual values of the master drive capability. The value set of the particle drive capability is expressed as (b1, b2, b3, b4), which respectively correspond to the actual values of the particle drive capability shown in Table 2. Similarly, the value set of the voltage provided by the master is expressed as (c1, c2, c3, c4), and the value set of the on-die termination resistance of the particles is expressed as (d1, d2, d3, d4). The so-called real number encoding refers to using real numbers to replace the possible values of these control parameters. For example, a1, a2, a3, a4, a5, a6, a7, a8, a9 are encoded as 1, 2, 3, 4, 5, 6, 7, 8, 9 respectively, b1, b2, b3, b4 are encoded as 10, 11, 12, 13 respectively, c1, c2, c3, c4 are encoded as 14, 15, 16, 17 respectively, and d1, d2, d3, d4 are encoded as 18, 19, 20, 21 respectively.

After encoding, among the multiple real numbers 1 to 21, each number from 1 to 9 represents a possible value of the master drive capability. These real numbers can be referred to as the encoded values of the master drive capability, which correspond to the actual values of master drive capability. For example, the encoded value "3" of the master drive capability corresponds to the actual value "75Ω" of the master drive capability. Each real number from 10 to 13 corresponds to the actual value of the control parameter of the particle drive capability. Each real number from 14 to 17 corresponds to the actual value of the control parameter of the voltage provided by the master. Each real number from 18 to 21 corresponds to the actual value of the control parameter of the on-die termination resistance of the particle.

The encoding method illustrated in the above example is only one of multiple encoding methods. The operation method provided by the examples of the present disclosure can also adopt other encoding methods, such as two-dimensional array encoding.

Here, the value of the control parameter can be referred to as a solution space of the problem, such as the master drive capability being 150Ω. Encoding is to complete the conversion from the solution space to the search space (or genetic space), or from the actual value to the encoded value, such as the master drive capability of 150Ω being coded as 2 in the example of the present disclosure. Since the genetic algorithm cannot directly process the parameters of the solution space, the problem to be solved needs to be expressed as chromosomes or individuals in the search space through encoding, so that the optimal solution can be found in the search space.

In the examples of the present disclosure, the genetic algorithm processes the encoded values of the control parameters, unless otherwise specified. In response to receiving the training instruction, the processor randomly selects values from the encoded value set of the control parameters to generate a plurality of control parameter sets. These control parameters are used to adjust the quality of signal transmission between the memory controller and the memory. In some examples, the quality of the signal transmission of the bus can be measured by the size of the area of the eye diagram. As mentioned in the previous example, there are a plurality of parameters that affect signal quality, for example, the master drive capability, the particle drive capability, the voltage provided by the master, the on-die termination resistance of the particles, and so on.

The processor generates a plurality of control parameter sets randomly in response to receiving the training instruction. Combined with the plurality of control parameters mentioned in the previous examples and with reference to FIG. 9, selecting values of the master drive capability, the particle drive capability, the voltage provided by the master, and the on-die termination resistance of the particles respectively from their possible value ranges to obtain a control parameter set. For example, 5 is taken for the master drive capability, 12 is taken for the particle drive capability, 15 is taken for the voltage provided by the master, and 18 is taken for the on-die termination resistance of the particles. The thus obtained (5, 12, 15, 18) is denoted as a control parameter set.

A plurality of values are selected randomly to obtain the plurality of control parameter sets. For example, z control parameter sets can be obtained by selecting values randomly, and z is a positive integer greater than 10, as shown in Table 4:

TABLE 4

| Control parameter set 1 | 5, 12, 15, 18 |
| Control parameter set 2 | 2, 10, 17, 19 |
| Control parameter set 3 | 4, 13, 15, 18 |
| Control parameter set 4 | 6, 13, 15, 21 |
| Control parameter set 5 | 2, 10, 14, 20 |
| Control parameter set 6 | 2, 10, 16, 20 |
| Control parameter set 7 | 8, 13, 16, 19 |
| Control parameter set 8 | 5, 12, 15, 18 |
| Control parameter set 9 | 1, 13, 14, 20 |
| Control parameter set 10 | 9, 11, 15, 20 |
| . . . | . . . |
| Control parameter set z | 3, 10, 14, 20 |

Since the examples of the present disclosure take the four control parameters including the master drive capability, the particle drive capability, the voltage provided by the master, and the on-die termination resistance of the particles as examples for explanation, the control parameter sets (that is, the individuals or chromosomes) provided by the examples of the present disclosure include four genes, of which the first gene represents the master drive ability, with a value ranging from 1 to 9, the second gene represents the particle drive ability, with a value ranging from 10 to 13, the third gene represents the voltage provided by the master, with a value ranging from 14 to 17, and the fourth gene represents the on-die termination resistance of the particle, with a value ranging from 18 to 21.

Since each control parameter set is obtained randomly, there may be repeated control parameter sets that need to be removed after the plurality of control parameter sets are determined, or there may be some control parameter sets that do not comply with specifications or protocols. Referring to FIG. 10, after S210 and before S230, the method provided by this example also includes:

S220: Removing a control parameter set that fails to meet a preset requirement among the plurality of control parameter sets.

The control parameter set that fails to meet the preset requirements here include repeated or redundant control parameter sets or control parameter sets having a plurality of control parameters with contradictions or conflicts therebetween. For example, in one possible example, the plurality of control parameter sets are randomly generated, but there may be control parameter sets that do not meet the requirements among these control parameter sets. For example, because the plurality of control parameter sets are randomly generated, there may be repeated control parameter sets. Alternatively, in some other possible examples, the values of the control parameters in some control parameter sets might conflict or contradict each other. For example, the voltage provided by the master control (NVDDR3, 10%), and the on-die termination resistance of the particle (60Ω) are taken as an example, if the NVDDR3 mode being selected to adjust the 10% of the reference voltage is in conflict with the resistance value of 60Ω, this control parameter set that does not meet the requirements.

For example, in a possible example, a plurality of check tables can be set in advance, and the check tables include control parameter sets that do not meet the requirements. After randomly generating the plurality of control parameter sets, the generated control parameter sets are compared with the control parameter sets that do not meet the requirements in the check tables. If there is a match, the control parameter set is removed.

For example, after removing the control parameter sets that do not meet the requirements, the remaining control parameter sets are used as an initial group, and the genetic iteration is performed based on the initial group. In one possible example, it is assumed that after the control parameter sets that do not meet the preset requirements are removed, there are 20 control parameter sets remaining, then these 20 control parameter sets can be used as an initial group, and the group size is 20. When the group size is small, the running speed of the genetic algorithm can be improved, but the diversity of individuals in the group is reduced, which may cause premature convergence of the genetic algorithm. When the group size is large, it is beneficial to maintain the diversity of individuals in the group, however, individual competition will be affected and the amount of calculation will increase. Therefore, different group sizes should be determined according to different practical problems. In some examples, the group size ranges from 20 to 100.

Genetic algorithms use fitness to evaluate individuals in a group. For example, after randomly generating the plurality of control parameter sets, the fitness of each control parameter set needs to be calculated and determined.

In the example of the present disclosure, the control parameter set is used to adjust the signal transmission between the memory controller and the memory, and the eye diagram is used to evaluate the signal integrity and signal transmission quality in the digital communication system. Therefore, in the example of the present application, the area of the eye diagram can be regarded as the fitness of the control parameter set. The eye diagram is a visual tool used to measure the signal quality of a digital communication system. In examples of the present disclosure, if the fitness of a certain control parameter set is to be determined, the memory controller and memory are configured firstly based on the control parameter set, and then the size of the area of the eye diagram for the signal transmission between the configured memory controller and the memory is obtained. The size of the area of the eye diagram serves as the fitness of the control parameter set.

For example, referring to FIG. 11, in a possible example, when determining the fitness of the control parameter set, S230 includes the following sub-operations:

S230-1: Configuring the memory controller and the memory based on the control parameter set.

S230-2: Sending a read instruction to the memory and obtaining an area of an eye diagram when valid data is read from the memory, and determining, as the fitness of the control parameter sets, the area of the eye diagram.

In combination with FIG. 4, the memory controller is connected to the memory via the flash memory interface circuit. The processor can configure the memory controller based on the control parameters in the control parameter sets, such as configuring the master drive capability, the voltage provided by the master, etc. The processor can also send instructions to the memory via the flash memory interface circuit to configure the memory, for example, configuring the particle drive capability, the on-die termination resistance of the particles, etc.

However, the genetic algorithm operates on encoded data, such as the master drive capability of 150Ω being encoded as 2, and cannot be used to configure the memory controller or memory. Therefore, before configuring, it is required to decode the encoded values of the control parameter set firstly to obtain the actual values of the control parameter set.

The way of decoding the encoded values of the control parameter set corresponds to the encoding method. In some examples, after encoding the actual values of the control parameter, the correspondence between the actual values and the encoded values of the control parameters can be saved. When decoding the encoded values of the control parameters, the actual values of the control parameters can be obtained by decoding based on the encoded values of the control parameters and the correspondence between the actual values and the encoded values of the control parameters, such as "2" in the control parameter set is decoded to obtain "master drive capacity: 150Ω".

Based on the actual values of the control parameters obtained by decoding, the memory controller and the memory are configured. For example, the flash memory interface circuit of the memory controller is configured. Instructions including the control parameters are sent to the memory via the flash memory interface circuit to configure the memory.

After the memory controller and memory are configured, the memory controller sends a write command to the memory to write data into the memory.

After writing the data into the memory, the memory controller sends a read instruction to the memory, reads the data stored in the memory, obtains the area of eye diagram when valid data is read from the memory, and determines, as the fitness of the control parameter set, the area of the eye diagram.

As an example, in a possible example, S230-2 includes:

S230-2-1: Adjusting phases of a rising edge and a falling edge of a data strobe signal DQs repeatedly, and then sending the read instruction to the memory and determining a value range of the phases of the rising edge and the falling edge of the DQs for which the valid data is read.

After the configuration of the memory controller and memory is completed based on the actual values of the control parameters in the control parameter set, the processor will send a write command and a read command. The write command is transmitted to the memory through the data signal (DQ) of the bus, and then the data stored in memory is transmitted back to a buffer of the memory controller through the data signal (DQ) of the bus by the read command. After that, the content of the written data and the content of the data read back are compared. If they are completely consistent, it means that valid data can be read, and this control parameter set is valid. If they are inconsistent, it means that valid data cannot be read, and the control parameter set is invalid.

Since the reading of data is sampled on the rising and falling edges of the data strobe signal (DQs), the values of the phases (from 0 to 180 degrees) of the rising and falling sampling edges of the data strobe signal (DQs) are adjusted to align with the center position of DQ, thereby finding the range of phases of the rising edge and falling edge of the data strobe signal when valid data can be read, and recording the range of values of the phases of the rising edge and falling edge of the data strobe signal DQs.

S230-2-2: Determining, as the fitness of the control parameter sets, the area of the eye diagram enclosed by the value range of the phases of the rising edge and the falling edge of the DQs for which the valid data is read in a coordinate system, wherein a horizontal axis of the coordinate system is the phase of the rising edge of the DQs, and a vertical axis of the coordinate system is the phase of the falling edge of the DQs.

Referring to FIG. 12, as an example, the value range of the phases of the rising edge and the falling edge of the data strobe signal DQs can be marked in a coordinate system, wherein the horizontal axis of the coordinate system can be the phase of the rising edge of DQs, and the vertical axis of the coordinate system is the phase of the falling edge of DQs. By searching for the valid intervals of the phases of the rising edge and the falling edge of DQs, the sampling range in which the valid data is read can be obtained, and the size of the area of the eye diagram enclosed by the value range of phase of the rising edge and falling edge of the data strobe signal in the coordinate system is determined as the fitness of the control parameter set. The size of the area of the eye diagram herein can be approximately considered as the product of the phase value range of the rising edge of the data strobe signal in which the data signal can be effectively sampled and the phase value range of the falling edge in which the data signal can be effectively sampled. The broader the phase value range of the rising edge of the data strobe signal in which the data signal can be effectively sampled and the phase value range of the falling edge in which the data signal can be effectively sampled, the broader the range in which the valid data can be read, the greater the area of the eye diagram, and the better the signal transmission quality of the bus.

Modeled on the process of reproduction, mating, and gene mutation of species in nature, genetic algorithms have three basic genetic operations: selection, crossover, and mutation. These genetic operations are performed under random circumstances, and genetic operations are regarded as the core of genetic algorithms, and directly affect the optimization ability of genetic algorithm.

As an example, based on FIG. 6, and referring to FIG. 13, in S250, the operations of updating the plurality of control parameter sets iteratively using a genetic algorithm include:

S250-1: Determining whether the iteration stop condition is satisfied.

If the iteration stop condition is not satisfied, S250-2 is executed, and the plurality of parameter sets are updated iteratively based on the genetic algorithm. If the iteration stop condition is satisfied, S270 is executed.

S250-2: Selecting a plurality of control parameter sets on which a crossover operation is to be performed based on the fitness of the control parameter sets.

S250-3: Performing a genetic crossover on any two control parameter sets among the plurality of control parameter sets on which the crossover operation is to be performed using the genetic algorithm.

S250-4: Performing a genetic mutation on the control parameter sets on which the crossover operation has been performed using the genetic algorithm.

The selection operation is the process of selecting individuals with strong vitality in the group to generate a new group. The genetic algorithm uses the selection operator to perform the survival of the fittest operation on the individuals in the group, and makes selections based on the fitness of each individual. The probability that individuals with high fitness are inherited to the next generation of group is greater, and the probability that individuals with low fitness are inherited to the next generation of group is smaller. In this way, multiple genetic iterations can make the fitness of individuals in the group continue to approach the optimal solution.

The selection operation is based on the evaluation of individual fitness and can improve global convergence and computational efficiency. The selection operation of the genetic algorithm is similar to the selection mechanism in nature, embodying the evolution mechanism of "survival of the fittest and elimination of the unfit". The method of example is that individuals with excellent "traits" have more opportunities to be selected to produce offspring, while individuals with inferior "traits" have a smaller chance of being selected. The "traits" herein can be numerically quantified through fitness evaluation operations. Commonly used selection methods include: roulette selection, sorted selection, etc. The example of the present disclosure takes the roulette selection method as an example. The roulette selection method is also referred to as the fitness proportion method. All selections are selected from the current population based on the fitness value of individuals and into the next generation of population according to set rules.

As an example, in a possible example, S250-2 includes:

S250-2-1: Determining a probability of each of the control parameter sets being selected, the probability of being selected being a ratio of the fitness of the control parameter set to a sum of the fitness of all the control parameter sets.

For example, the roulette selection method can be expressed as follows:

$$P_i = \frac{f_i}{\Sigma_{i=1}^{M} f_i}$$

wherein $P_i$ represents the probability that the i-th individual (referring to the control parameter set in the example of the present disclosure) is selected, $f_i$ represents the value of the fitness of the i-th individual, and M is the number of the population. Obviously, the probability of being selected only reflects the proportion of individual fitness to the sum of fitness of individuals in the entire group. The greater the fitness of an individual, the higher its probability of being selected.

S250-2-2: Setting a random number between 0 and 100%, and selecting, as the control parameter set on which the crossover operation is to be performed, the control parameter set whose probability of being selected is greater than the random number.

For example, taking 10 control parameter sets as an example, it is assumed that the probabilities of control parameter set 1 to control parameter set 10 being selected as shown in Table 5:

TABLE 5

| Control parameter set | $P_i$ |
|---|---|
| Control parameter set 1 | 95% |
| Control parameter set 2 | 43% |
| Control parameter set 3 | 84% |
| Control parameter set 4 | 42% |
| Control parameter set 5 | 8% |
| Control parameter set 6 | 66% |
| Control parameter set 7 | 53% |
| Control parameter set 8 | 44% |
| Control parameter set 9 | 71% |
| Control parameter set 10 | 18% |

If the selected random number is 60%, then the control parameter set with a probability of being selected greater than 60% will be selected. For example, based on Table 6, control parameter set 1, control parameter set 3, control parameter set 6, and control parameter set 9 will be selected, and the selected control parameter sets will undergo the next genetic operation and serve as the control parameter set on which the crossover operation is to be performed.

In the above examples, the examples of the number of control parameter sets and the values of the above random numbers are only for illustrative explanation of this scheme, and are not limitations of this scheme. The number of control parameter sets can also be other numbers, and the set random number can also be other random numbers.

The selected control parameter set has a higher fitness, indicating better adaptability to the environment. For this scheme, it means that the quality of signal transmitted over the bus between the memory controller and the memory corresponding to these control parameter sets is higher. The selected control parameter set can undergo the next genetic operation, such as a crossover operation.

The crossover operation is used in genetic algorithms to generate new individuals. Crossover, also known as recombination, refers to the interchange of some genes of two paired chromosomes in a certain way to form two new individuals. Crossover reflects the interchange of information between different individuals in the same group and is an important feature that distinguishes genetic algorithms from other evolutionary algorithms. Crossover plays a key role in genetic algorithms and is the main approach for generating new individuals.

As an example, in a possible example, S250-3 includes:

S250-3-1: Selecting a starting position and an interchange length randomly for any two of the control parameter sets on which the crossover operation is to be performed, and interchanging a part of the control parameters of the two of the control parameter sets on which the crossover operation is to be performed to generate the control parameter sets on which the crossover operation has been performed.

Crossover refers to the interchange of a part of genes between two paired chromosomes in a certain way to form two new individuals. Taking the control parameter sets provided by the example of the present disclosure as an example, each control parameter set includes 4 genes, that is, 4 encoded values. Each encoded value corresponds to a control parameter. For example, the starting position is randomly selected to be the second gene, the interchange length is 2 genes, and the control parameter sets on which the crossover operation has been performed can be obtained by interchanging a part of the control parameters of the two of the control parameter sets on which the crossover operation is to be performed.

For example, with reference to FIG. 14, the crossover of control parameter set 1 and control parameter set 2 is taken as an example. For example, control parameter set 1 is (5, 12, 15, 18) and control parameter set 2 is (2, 10, 17, 19). The starting position is randomly selected to be the second gene, the interchange length is 2 genes, and a part of the control parameters of control parameter set 1 and control parameter set 2 are interchanged. That is, the second gene of control parameter set 1 is replaced with the second gene of control parameter set 2, and the third gene of control parameter set 1 is replaced with the third gene of control parameter set 2, to obtain control parameter set 1'. At the same time, the second gene of control parameter set 2 is replaced with the second gene of control parameter set 1, and the third gene of control parameter set 2 is replaced with the third gene of control parameter set 1, to obtain control parameter set 2'. In this way, a crossover operation is performed on the control parameter set 1 (5, 12, 15, 18) and the control parameter set 2 (2, 10, 17, 19) to obtain control parameter set 1' (5, 10, 17, 18), and control parameter set 2' (2, 12, 15, 19).

For example, any two of the control parameter sets on which the crossover operation is to be performed are paired, and each two is taken as a group. The crossover operation is performed on the two control parameter sets on which the crossover operation is to be performed in a group of control parameter sets to obtain the plurality of new control parameter sets.

By a crossover operation, a part of the control parameters of two control parameter sets are interchanged to form two new control parameter sets, such as control parameter sets on which the crossover operation or interchange operation has been performed. After the crossover operation, mutation operations can also be performed randomly. Mutation in genetic algorithms refers to replacing the gene value at a certain locus of an individual with other alleles of the locus to form a new individual. The combination of mutation, selection, and crossover can improve the effectiveness of genetic algorithms, enhance the search capabilities of genetic algorithms, and maintain the diversity of the group.

By way of example, in a possible example, the above S250-4 includes:

S250-4-1: For any of the control parameter sets on which the crossover operation has been performed, replacing a random control parameter in the control parameter set with any other value in a value set of the control parameter according to a set mutation probability.

Mutation operation refers to replacing the gene value at a certain locus of an individual with other alleles of the locus to form a new individual. For example, in the example of the present disclosure, the control parameter set as an individual includes multiple genes, and each gene is essentially the value of a control parameter. For example, in conjunction with Table 1, taking the control parameter of master driving ability as an example, the value set of master drive capability includes 9 possible values, and the corresponding real number encoded values are 1-9. Assuming that in a certain control parameter set, the value of the master drive capability is 1, then mutation means replacing 1 with any one from 2 to 9. If the encoded value of the master drive ability is still 1 after the mutation, then it can be considered that no mutation has occurred.

For example, combining Table 4 and FIG. 15, taking control parameter set 1 as an example, the control parameter set 1 is (5, 12, 15, 18), and assuming that the first gene of the control parameter set mutates, the first gene represents the master drive ability and has a encoded value range of 1 to 9. Then, the first gene 5 of control parameter set 1 can be mutated to any value from 1 to 9 except 5. For example, control parameter set 1 (5, 12, 15, 18) can be mutated into: (1, 12, 15, 18), or (3, 12, 15, 18), or (7, 12, 15, 18) and so on.

In addition, it should be noted that the mutation operation occurs randomly, the position of the mutation may be any gene in the control parameter set, and the probability of the mutation of the gene may also be random. That is, mutations may or may not occur.

In a possible example, the probability of mutation can be given in advance. For example, the mutation probability of the control parameter set on which the crossover operation has been performed can be set. When the mutation probability is greater, mutations are more likely to occur. When mutation probability is smaller, mutations are less likely to occur.

Selection, crossover, and mutation can generate a new generation of groups, that is, generate a plurality of new control parameter sets. After generating new groups, an update is completed, or an iteration is completed. After a new generation of control parameter sets is generated, the fitness of each control parameter set in the plurality of control parameter sets of the new generation is determined, and whether it meets the iteration stop condition is determined. If the iteration stop condition is not satisfied, iterative update needs to continue, new control parameter sets are generated, and it is determined whether the new control parameter sets satisfy the iteration stop condition; and if the iteration stop condition is satisfied, the iteration is stopped.

For example, in a possible example, the iteration stop condition may include: the fitness of the control parameter set reaches a set value.

As mentioned in the previous examples, fitness is the degree of adaptability of an individual to the environment. In the scheme provided by the example of the present disclosure, the fitness of the control parameter set is the size of the area of the eye diagram for the signal transmission of the bus between the memory controller and the memory corresponding to the control parameter set. The higher the fitness, the greater the area of eye diagram for the signal transmission of the bus, and the better the quality of the signal transmission of the bus. Therefore, when the fitness of that control parameter set reaches the set value, it indicates that the quality of the signal transmission of the bus corresponding to the control parameter set has reached a good level, and the iteration can be stopped.

In another possible example, the iteration stop condition may also include: a total number of the filtered control parameter sets reaches a first preset number, wherein the first preset number satisfies:

$$n = \frac{t}{2k \cdot (l/v)} \cdot m$$

wherein n is the first preset number, t is a calibration time length specified in a specification, l is a length of bytes transmitted, v is a rate of a bus, k is an average of the number of times values of the phases of the rising edge and the falling edge of the DQs are adjusted, and m is a number of channels of the memory (for example, in the example of the present disclosure, the number of channels is 16).

For example, assuming the transmission rate of the bus is 1600 M/s and the bus transmits an instruction of 4K bytes at one time, the time required to transmit 4K bytes is: 4096/1600=2.56 us (microseconds). It is required to complete a data write operation and a data read operation for verification of a piece of test data. That is, it is necessary to perform OFNI write and read commands, and the verification time for a control parameter set is 2.56*2=5.12us. If the time length for calibrating control parameters is specified to be 100 milliseconds (ms), it means that up to 100 milliseconds can be spent searching for optimal control parameters to adjust the quality of the signal transmission of the bus. The average number of times of searching for the values of the phases of the rising edge and falling edge of DQs is 256, then the total number of optimal control parameter set filtering completed at one time is: (100000/(5.12*256))*16=76.3*16=1220, that is, using 16 channels of the memory, a maximum of 1220 control parameter sets can be iteratively updated or filtered within 100 milliseconds. When the total number of filtered control parameter sets reaches 1220, the iteration is terminated.

For example, in a possible example, the processor of the memory controller may include multiple cores. In order to speed up the entire search process, different operations may be assigned to different cores for processing. For example, generating a plurality of control parameter sets randomly, removing control parameter sets that do not meet the preset requirements, determinating the fitness of the control parameter sets, selection, crossover, mutation and other genetic operations on the control parameter sets can be assigned to different core for running, and different cores can communicate with each other via queues. Taking the memory system supporting 16 channels as an example, 16 channels can write and read data under the control of multiple cores. Therefore, in the above example, when calculating the first preset number, it is calculated by multiplying the number of control parameter sets that can be filtered within a specified time for a single channel by the number of channels of 16. Multiple channels are controlled in parallel under the control of different cores to determine the fitness of the control parameter sets, so that as many control parameter sets as possible can be filtered in less time to improve search efficiency and reduce search time. In some other possible examples, the processor of the memory controller may be a single core, so that the number of channels that can be parallelized is smaller, and therefore the total number of control parameter sets that can be searched within a specified time is also smaller.

The higher the fitness, the greater the area of the eye diagram for the signal transmission of the bus, and the better the quality of the signal transmission of the bus. Therefore, after the iteration is stopped, the control parameter set with the greatest fitness among the plurality of control parameter sets obtained in the latest iterative update is determined as a target control parameter set.

Since the genetic algorithm operates on encoded data, the examples provided in the examples of the present disclosure take real number encoding as an example, which means that the obtained target control parameter set is essentially a group of numbers, such as (3, 12, 17, 18). Such data cannot be directly used to configure the memory controller and memory. Thus, the target control parameters also need to be decoded. The principle of decoding has been introduced in the previous example and will not be explained in detail here.

After decoding the target control parameter set to obtain the actual value of the target control parameter set, the memory controller and the memory can be configured based on the actual value of the target control parameter set, which can ensure the quality of the signal transmission between the memory controller and the memory.

When the working environment of the memory system changes, such as when the temperature changes, the quality of the signal transmission of the bus between the memory controller and the memory might decrease, thus affecting the read and write performance of the memory system. The operation method provided by the example of the present disclosure is based on the genetic algorithm to determine the target control parameter set, that is, to determine the optimal control parameter to adjust the size of the area of the eye diagram for the signal transmission of the bus between the memory controller and the memory, or determine the best control parameters to adjust the quality of the signal transmission of the bus between the memory controller and the memory. Configuring the memory controller and memory based on the control parameters in the target control parameter set can ensure the quality of the signal transmission of the bus between the memory controller and the memory. Compared with the global traversal or search method mentioned in the previous example, using genetic algorithms to determine the optimal control parameters is faster and more efficient, and the optimal control parameters can be quickly found to ensure the quality of the signal transmission of the bus between the memory controller and the memory to improve the read and write performance of the memory system.

In addition, the operation method provided by the examples of the present disclosure can be triggered automatically when the environment changes, or can be executed in response to training instructions sent by the user via the host, thus improving the adaptability of the memory system or electronic device to different environments.

An example of the present disclosure also provides a memory controller, which may be, for example, the memory controller 110 shown in FIG. 4. The memory controller 110 includes a processor 111, a buffer 112, an error correction code (ECC) circuit 113, a host interface circuit 114 and a flash memory interface circuit 115. The memory controller 110 is coupled to the memory 120. For example, the processor 111 is connected to the host 10 via the host interface circuit 114 and connected to the memory 120 via the flash memory interface circuit 115.

In response to receiving the training instruction, the processor 111 generates a plurality of control parameter sets randomly. The control parameter sets are used to adjust the size of the eye diagram for the signal transmission between the memory controller 110 and the memory 120, that is, to adjust the quality of the signal transmission of the bus between the memory controller 110 and the memory 120. The processor 111 is further configured to determine the fitness of the control parameter sets. After determining the fitness of the control parameter sets, the processor 111 is further configured to update the plurality of control parameter sets iteratively using a genetic algorithm until an iteration stop condition is satisfied. The processor 111 is further configured to: after the iteration is stopped, determine, as a target control parameter set, a control parameter set with the greatest fitness among the plurality of control parameter sets obtained in the latest iterative update, and
configure the memory controller 110 and the memory 120
based on the control parameters in the target control param-
eter set to ensure the quality of the signal transmission of the
bus between the memory controller 110 and the memory
120.

In a possible example of the present disclosure, the
processor 111 is configured to configure the memory con-
troller 110 and the memory 120 according to the control
parameters in the control parameter set. After the configu-
ration is completed, the processor 111 is further configured
to send a read instruction to the memory 120 and obtain the
area of eye diagram when valid data is read from the
memory 120, and determines, as the fitness of the control
parameter set, the area of the eye diagram.

In a possible example of the present disclosure, the
processor 111 is configured to: adjust phases of a rising edge
and a falling edge of a data strobe signal DQs repeatedly, and
then send the read instruction to the memory and determine
a value range of the phases of the rising edge and the falling
edge of the DQs for which the valid data is read; and
determine, as the fitness of the control parameter sets, the
area of the eye diagram enclosed by the value range of the
phases of the rising edge and the falling edge of the DQs for
which the valid data is read in a coordinate system, wherein
a horizontal axis of the coordinate system is the phase of the
rising edge of the DQs, and a vertical axis of the coordinate
system is the phase of the falling edge of the DQs.

In a possible example of the present disclosure, the
processor 111 is further configured to remove a control
parameter set that fails to meet a preset requirement among
the plurality of control parameter sets before determining the
fitness of the control parameter sets. Since the control
parameter sets are randomly generated, there may be control
parameter sets that do not meet the preset requirements
among the plurality of randomly generated control param-
eter sets. For example, there may be repeated or redundant
control parameter sets, or there may be some control param-
eter sets with control parameters conflict with each other or
do not meet the requirements of the agreement or regula-
tions, among randomly generated control parameter sets.
Therefore, before determining the fitness of the control
parameter set, it is necessary to remove control parameter
sets that do not meet the preset requirements among the
plurality of control parameter sets to reduce the amount of
calculation.

Selection, crossover and mutation are commonly used
genetic operations of genetic algorithms. In a possible
example of the present disclosure, when using a genetic
algorithm to iteratively update the plurality of control
parameter sets, the processor 111 is configured to: select a
plurality of control parameter sets on which a crossover
operation is to be performed based on the fitness of the
control parameter sets; perform a genetic crossover on any
two control parameter sets among the plurality of control
parameter sets on which the crossover operation is to be
performed using the genetic algorithm; and perform a
genetic mutation on the control parameter sets on which the
crossover operation has been performed using the genetic
algorithm.

In a possible example of the present disclosure, the
processor 111 is configured to: determine a probability of
each of the control parameter sets being selected, the prob-
ability of being selected being a ratio of the fitness of the
control parameter set to a sum of the fitness of all the control
parameter sets; and set a random number between 0 and
100%, and select, as the control parameter set on which the crossover operation is to be performed, the control param-
eter set whose probability of being selected is greater than
the random number. The greater the fitness, the greater the
probability that the control parameter set is selected.

In a possible example of the present disclosure, after the
selection operation, the processor 111 is configured to: select
a starting position and an interchange length randomly for
any two of the control parameter sets on which the crossover
operation is to be performed, and interchange a part of the
control parameters of the two of the control parameter sets
on which the crossover operation is to be performed to
generate the control parameter sets on which the crossover
operation has been performed.

In a possible example of the present disclosure, the
processor 111 is configured to: for any of the control
parameter sets on which the crossover operation has been
performed, replace a random control parameter in the con-
trol parameter set with any other value in a value set of the
control parameter according to a set mutation probability.

It should be noted that selection, crossover and mutation
are all random. Taking mutation as an example, according to
the set mutation probability, the value of a random control
parameter in the control parameter set is replaced with a
random value of the control parameter, indicating that a
mutation may or may not occur.

After selection, crossover and mutation, a new generation
of control parameter sets is obtained. The fitness of the new
generation of control parameter sets is calculated again to
determine whether the iteration stop condition is satisfied. If
the iteration stop condition is not satisfied, iterative update
based on the genetic operation such as selection, crossover
and mutation continues to obtain a next generation of control
parameter sets, and stops until the iteration stop condition is
satisfied.

In a possible example, the iteration stop condition
includes: the fitness of the control parameter sets reaches a
set value, or a total number of the filtered control parameter
sets reaches a first preset number, wherein the first preset
number satisfies:

$$n = \frac{t}{2k \cdot (l/v)} \cdot m$$

wherein n is the first preset number, t is a calibration time
length specified in a specification, l is a length of bytes
transmitted, v is a rate of a bus, k is an average of the
number of times values of the phases of the rising edge
and the falling edge of the DQs are adjusted, and m is
a number of channels of the memory.

Examples of the present disclosure further provide a
memory system, which may be, for example, the memory
system shown in FIG. 2 or FIG. 3 in the foregoing examples.
The memory system includes a memory 120 and the
memory controller 110 provided in the foregoing examples.
The memory controller 110 is coupled to the memory 120
via the flash memory interface circuit 115 to control the
memory 120 to store data.

In the foregoing examples, in order to introduce and
illustrate the technical solution provided by the present
disclosure, a NAND flash memory is used as an example to
introduce the features and functions of the inventive concept
of the present disclosure. In some other possible examples,
the above-mentioned memory may also be other memories,
such as dynamic random access memory (DRAM), etc.

Examples of the present disclosure further provide an electronic device, which may be, for example, the electronic device shown in FIG. 1 in the foregoing example. The electronic device includes a host 10 and the memory system 11 provided in the foregoing examples. The host 10 is connected to the memory system 11 to write data into memory system 11 or to read data stored in the memory system 11.

In one possible example, the host 10 is configured to send a training instruction to the memory system 11 in response to a user operation. The memory system 11 receives the training instruction and determines an optimal control parameter to adjust the quality of the signal transmission of the bus between the memory controller 110 and the memory 120, and the memory controller 110 and the memory 120 can be configured based on the determined optimal control parameters to improve the quality of the signal transmission of the bus between the memory controller 110 and the memory 120.

The above are only specific examples of the present disclosure, but the protection scope of the present disclosure is not limited thereto. Any changes or substitutions that can be readily contemplated by those skilled in the art within the technical scope disclosed by the present disclosure should be covered by the protection scope of the present disclosure. Therefore, the protection scope of the present disclosure should be subject to the protection scope of the claims.

What is claimed is:

1. A method for operating a memory controller, the memory controller being coupled to a memory and comprising at least one processor, wherein the method comprises:

in response to the at least one processor receiving a training instruction, generating a plurality of control parameter sets randomly, the plurality of control parameter sets being used to adjust signal transmission between the memory controller and the memory;

determining fitness of the plurality of control parameter sets, comprising:

configuring the memory controller and the memory based on the plurality of control parameter sets;

adjusting phases of a rising edge and a falling edge of a data strobe signal (DQs) repeatedly; and sending a read instruction to the memory and determining a value range of the phases of the rising edge and the falling edge of the DQs for which valid data is read; and determining, as the fitness of the plurality of control parameter sets, an area of an eye diagram enclosed by the value range of the phases of the rising edge and the falling edge of the DQs for which the valid data is read in a coordinate system, wherein a horizontal axis of the coordinate system is the phase of the rising edge of the DQs, and a vertical axis of the coordinate system is the phase of the falling edge of the DQs;

updating the plurality of control parameter sets iteratively using a genetic algorithm until an iteration stop condition is satisfied; and after the iteration is stopped, determining, as a target control parameter set, a control parameter set with the greatest fitness among the plurality of control parameter sets obtained in the latest iterative update.

2. The method of claim 1, further comprising, before the determining fitness of the plurality of control parameter sets:

removing a control parameter set that fails to meet a preset requirement from the plurality of control parameter sets.

3. The method of claim 1, wherein the updating the plurality of control parameter sets iteratively using a genetic algorithm comprises:

selecting a plurality of control parameter sets on which a crossover operation is to be performed based on the fitness of the plurality of control parameter sets; and performing a genetic crossover on two control parameter sets among the plurality of control parameter sets on which the crossover operation is to be performed using the genetic algorithm.

4. The method of claim 3, wherein the updating the plurality of control parameter sets iteratively using a genetic algorithm further comprises:

performing a genetic mutation on the plurality of control parameter sets on which the crossover operation has been performed using the genetic algorithm.

5. The method of claim 4, wherein the plurality of control parameter sets comprise a plurality of control parameters, and the performing a genetic mutation on the plurality of control parameter sets on which the crossover operation has been performed using the genetic algorithm comprises:

for one of the plurality of control parameter sets on which the crossover operation has been performed, replacing a random control parameter in the control parameter set with another value in a value set of the control parameter according to a set mutation probability.

6. The method of claim 3, wherein the selecting a plurality of control parameter sets on which a crossover operation is to be performed based on the fitness of the plurality of control parameter sets comprises:

determining a probability of each of the plurality of control parameter sets being selected, the probability of being selected being a ratio of the fitness of the control parameter set to a sum of the fitness of the plurality of control parameter sets;

setting a random number between 0 and 100%; and selecting, as the control parameter set on which the crossover operation is to be performed, the control parameter set whose probability of being selected is greater than the random number.

7. The method of claim 3, wherein the plurality of control parameter sets comprise a plurality of control parameters, and the performing a genetic crossover on any two control parameter sets among the plurality of control parameter sets on which the crossover operation is to be performed using the genetic algorithm comprises:

selecting a starting position and an interchange length randomly for any two of the plurality of control parameter sets on which the crossover operation is to be performed; and interchanging a part of the control parameters of the two of the plurality of control parameter sets on which the crossover operation is to be performed to generate the plurality of control parameter sets on which the crossover operation has been performed.

8. The method of claim 1, wherein the iteration stop condition comprises:
the fitness of the plurality of control parameter sets reaches a set value, or
a total number of filtered plurality of control parameter sets reaches a first preset number, wherein the first preset number satisfies:

$$n = \frac{t}{2k \cdot (l/v)} \cdot m$$

wherein n is the first preset number, t is a calibration time length specified in a specification, l is a length of bytes transmitted, v is a rate of a bus, k is an average of the number of times values of phases of a rising edge and a falling edge of a data strobe signal (DQs) are adjusted, and m is a number of channels of the memory.

9. The method of claim 1, wherein the plurality of control parameter sets comprise a plurality of control parameters, and the method further comprises, before the generating a plurality of control parameter sets randomly:
obtaining the control parameters and a value set of the control parameters, wherein the value set of the control parameters comprises a plurality of values of the control parameters; and
encoding the value set of the control parameters.

10. A memory controller, comprising:
a flash memory interface circuit coupled to a memory; and
at least one processor coupled to the flash memory interface circuit, wherein the at least one processor is configured to:
in response to receiving a training instruction, generate a plurality of control parameter sets randomly, the plurality of control parameter sets being used to adjust signal transmission between the memory controller and the memory;
determine fitness of the plurality of control parameter sets, comprising:
configuring the memory controller and the memory based on the plurality of control parameter sets;
adjusting phases of a rising edge and a falling edge of a data strobe signal (DQs) repeatedly; and
sending a read instruction to the memory and determining a value range of the phases of the rising edge and the falling edge of the DQs for which valid data is read; and
determining, as the fitness of the plurality of control parameter sets, an area of an eye diagram enclosed by the value range of the phases of the rising edge and the falling edge of the DQs for which the valid data is read in a coordinate system, wherein a horizontal axis of the coordinate system is the phase of the rising edge of the DQs, and a vertical axis of the coordinate system is the phase of the falling edge of the DQs;
update the plurality of control parameter sets iteratively using a genetic algorithm until an iteration stop condition is satisfied; and
after the iteration is stopped, determine, as a target control parameter set, a control parameter set with the greatest fitness among the plurality of control parameter sets obtained in the latest iterative update.

11. The memory controller of claim 10, wherein the at least one processor is further configured to:

30 before the determining fitness of the plurality of control parameter sets, remove a control parameter set that fails to meet a preset requirement from the plurality of control parameter sets.

12. The memory controller of claim 10, wherein the at least one processor is configured to:
select a plurality of control parameter sets on which a crossover operation is to be performed based on the fitness of the plurality of control parameter sets; and
perform a genetic crossover on any two control parameter sets among the plurality of control parameter sets on which the crossover operation is to be performed using the genetic algorithm.

13. The memory controller of claim 12, wherein the at least one processor is further configured to:
perform a genetic mutation on the plurality of control parameter sets on which the crossover operation has been performed using the genetic algorithm.

14. The memory controller of claim 12, wherein the at least one processor is configured to:
determine a probability of each of the plurality of control parameter sets being selected, the probability of being selected being a ratio of the fitness of the control parameter set to a sum of the fitness of the plurality of control parameter sets;
set a random number between 0 and 100%; and
select, as the control parameter set on which the crossover operation is to be performed, the control parameter set whose probability of being selected is greater than the random number.

15. The memory controller of claim 10, wherein the iteration stop condition comprises:
the fitness of the plurality of control parameter sets reaches a set value, or
a total number of filtered control parameter sets reaches a first preset number, wherein the first preset number satisfies:

$$n = \frac{t}{2k \cdot (l/v)} \cdot m$$

wherein n is the first preset number, t is a calibration time length specified in a specification, l is a length of bytes transmitted, v is a rate of a bus, k is an average of the number of times values of phases of a rising edge and a falling edge of a data strobe signal (DQs) are adjusted, and m is a number of channels of the memory.

16. The memory controller of claim 10, wherein the plurality of control parameter sets comprise a plurality of control parameters, and the method further comprises, before the generating a plurality of control parameter sets randomly:
obtaining the control parameters and a value set of the control parameters, wherein the value set of the control parameters comprises a plurality of values of the control parameters; and
encoding the value set of the control parameters.

17. A memory system, comprising:
a memory; and
a memory controller connected to the memory via a flash memory interface circuit, wherein the memory controller comprises:
the flash memory interface circuit coupled to the memory; and at least one processor coupled to the flash memory interface circuit, wherein the at least one processor is configured to:

in response to receiving a training instruction, generate a plurality of control parameter sets randomly, the plurality of control parameter sets being used to adjust signal transmission between the memory controller and the memory;

determine fitness of the plurality of control parameter sets, comprising:

configuring the memory controller and the memory based on the plurality of control parameter sets;

adjusting phases of a rising edge and a falling edge of a data strobe signal (DQs) repeatedly; and sending a read instruction to the memory and determining a value range of the phases of the rising edge and the falling edge of the DQs for which the valid data is read; and determining, as the fitness of the plurality of control parameter sets, an area of an eye diagram enclosed by the value range of the phases of the rising edge and the falling edge of the DQs for which the valid data is read in a coordinate system, wherein a horizontal axis of the coordinate system is the phase of the rising edge of the DQs, and a vertical axis of the coordinate system is the phase of the falling edge of the DQs;

update the plurality of control parameter sets iteratively using a genetic algorithm until an iteration stop condition is satisfied; and after the iteration is stopped, determine, as a target control parameter set, a control parameter set with the greatest fitness among the plurality of control parameter sets obtained in the latest iterative update.

18. The memory system of claim 17, wherein the at least one processor is configured to:

before the determining fitness of the plurality of control parameter sets, removing a control parameter set that fails to meet a preset requirement from the plurality of control parameter sets.

19. The memory system of claim 17, wherein the plurality of control parameter sets comprise a plurality of control parameters, and the method further comprises, before the generating a plurality of control parameter sets randomly:

obtaining the control parameters and a value set of the control parameters, wherein the value set of the control parameters comprises a plurality of values of the control parameters; and encoding the value set of the control parameters.

20. The memory system of claim 17, wherein the at least one processor is configured to:

select a plurality of control parameter sets on which a crossover operation is to be performed based on the fitness of the plurality of control parameter sets; and perform a genetic crossover on any two control parameter sets among the plurality of control parameter sets on which the crossover operation is to be performed using the genetic algorithm.

* * * * *